(12) United States Patent
McDaniel et al.

(10) Patent No.: US 11,999,814 B2
(45) Date of Patent: Jun. 4, 2024

(54) MODIFICATIONS OF SULFATED BENTONITES AND USES THEREOF IN METALLOCENE CATALYST SYSTEMS FOR OLEFIN POLYMERIZATION

(71) Applicant: Chevron Phillips Chemical Company LP, The Woodlands, TX (US)

(72) Inventors: Max P. McDaniel, Bartlesville, OK (US); Qing Yang, Bartlesville, OK (US); Ryan N. Rose, Caney, KS (US); Kathy S. Clear, Bartlesville, OK (US); Graham R. Lief, Bartlesville, OK (US); Eric D. Schwerdtfeger, Bartlesville, OK (US); Anand Ramanathan, Bartlesville, OK (US); Jeremy M. Praetorius, Bartlesville, OK (US); Connor D. Boxell, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/065,003

(22) Filed: Dec. 13, 2022

(65) Prior Publication Data
US 2023/0192909 A1    Jun. 22, 2023

Related U.S. Application Data

(60) Provisional application No. 63/290,088, filed on Dec. 16, 2021.

(51) Int. Cl.
| | | |
|---|---|---|
| *C08F 4/02* | (2006.01) | |
| *C08F 4/659* | (2006.01) | |
| *C08F 4/6592* | (2006.01) | |
| *C08F 210/02* | (2006.01) | |

(52) U.S. Cl.
CPC .......... *C08F 4/025* (2013.01); *C08F 4/65916* (2013.01); *C08F 4/65925* (2013.01); *C08F 4/65927* (2013.01); *C08F 210/02* (2013.01); *C08F 2420/01* (2013.01); *C08F 2420/03* (2013.01)

(58) Field of Classification Search
CPC ....... C08F 4/02; C08F 4/6592; C08F 4/65916
See application file for complete search history.

(56) References Cited

U.S. PATENT DOCUMENTS

| | | | |
|---|---|---|---|
| 3,113,166 A * | 12/1963 | Weesner | C08F 10/00 585/510 |
| 3,242,099 A | 3/1966 | Manyik | |
| 3,248,179 A | 4/1966 | Norwood | |
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 5,352,749 A | 10/1994 | Dechellis | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,719,095 A | 2/1998 | Brekner | |
| 5,807,938 A | 9/1998 | Kaneko | |
| 5,919,983 A | 7/1999 | Rosen | |
| 6,239,235 B1 | 5/2001 | Hottovy | |
| 6,262,191 B1 | 7/2001 | Hottovy | |
| 6,531,550 B1 | 3/2003 | McDaniel | |
| 6,653,416 B2 | 11/2003 | McDaniel | |
| 6,683,016 B1 | 1/2004 | Youn | |
| 6,833,415 B2 | 12/2004 | Kendrick | |
| 7,026,267 B2 | 4/2006 | Chang | |
| 7,026,494 B1 | 4/2006 | Yang | |
| 7,041,617 B2 | 5/2006 | Jensen | |
| 7,148,298 B2 | 12/2006 | Jensen | |
| 7,199,073 B2 | 4/2007 | Martin | |
| 7,226,886 B2 | 6/2007 | Jayaratne | |
| 7,312,283 B2 | 12/2007 | Martin | |
| 7,470,758 B2 | 12/2008 | Jensen | |

(Continued)

FOREIGN PATENT DOCUMENTS

| | | |
|---|---|---|
| WO | 1999022860 A1 | 5/1999 |
| WO | 2006004709 A2 | 1/2006 |
| WO | 2006004789 A2 | 1/2006 |
| WO | 2011037971 A1 | 3/2011 |
| WO | 2014134028 A1 | 9/2014 |
| WO | 2020068888 A2 | 4/2020 |

OTHER PUBLICATIONS

Partial International Search Report and Written Opinion issued in related application No. PCT/US2022/081456, dated Apr. 5, 2023, 3 pp.

Amari A et al: "Optimised activation of bentonite for toluene adsorption", Applied Clay Science, Elsevier, Amsterdam, NL, vol. 47, No. 3-4, Feb. 1, 2010, pp. 457-461; XP026885490, ISSN: 0169-1317, DOI: 10.1016/J.CLAY.2009.11.035, [retrieved on Nov. 26, 2009].

Tayano Takao et al; "Study of Different Montmorillonites as "Support-Activators" for Metallocene-Catalyzed Propylene Polymerization", Clay science, Mar. 31, 2017 (Mar. 31, 2017), pp. 49-58, XP093031247, DOI: 10.11362/jcssjclayscience.20.3-4_49 Retrieved from the Internet: URL:https://www.jstage.jst.go.jp/article/j cssjclayscience/20/3-4/20_200303/_pdf/-cha r/ja [retrieved on Mar. 13, 2023].

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

*Primary Examiner* — Caixia Lu
(74) *Attorney, Agent, or Firm* — Merchant & Gould P.C.

(57) ABSTRACT

Sulfated bentonite compositions are characterized by a total pore volume from 0.4 to 1 mL/g, a total BET surface area from 200 to 400 m²/g, and an average pore diameter from 55 to 100 Angstroms. The sulfated bentonite compositions also can be characterized by a d50 average particle size in a range from 15 to 50 μm and a ratio of d90/d10 from 3 to 15. The sulfated bentonite compositions can contain a sulfated bentonite and from 10 to 90 wt. % of colloidal particles, or the sulfated bentonite compositions can contain a sulfated bentonite and from 0.2 to 10 mmol/g of zinc and/or phosphorus. These compositions can be utilized in metallocene catalyst systems to produce ethylene based polymers.

24 Claims, 12 Drawing Sheets

(56) References Cited

U.S. PATENT DOCUMENTS

| | | | |
|---|---|---|---|
| 7,517,939 | B2 | 4/2009 | Yang |
| 7,531,606 | B2 | 5/2009 | Hendrickson |
| 7,576,163 | B2 | 8/2009 | Yang |
| 7,598,327 | B2 | 10/2009 | Shaw |
| 7,619,047 | B2 | 11/2009 | Yang |
| 7,928,172 | B2 | 4/2011 | Luo |
| 8,114,946 | B2 | 2/2012 | Yang |
| 8,268,944 | B2 | 9/2012 | Yang |
| 8,426,538 | B2 | 4/2013 | Jensen |
| 8,796,409 | B2 | 8/2014 | Zhao |
| 8,822,608 | B1 | 9/2014 | Bhandarkar |
| 8,829,137 | B2 | 9/2014 | Lam |
| 9,096,745 | B2 | 8/2015 | Lam |
| 9,115,233 | B2 | 8/2015 | Ker |
| 9,175,119 | B2 | 11/2015 | Pannier |
| 9,695,254 | B2 | 7/2017 | Brambilla |
| 10,351,647 | B2 | 7/2019 | Holtcamp |
| 10,570,221 | B2 | 2/2020 | You |
| 10,919,996 | B2 | 2/2021 | McDaniel |
| 11,014,997 | B2 | 5/2021 | Ding |
| 11,059,918 | B2 | 7/2021 | Yang |
| 11,208,514 | B2 | 12/2021 | McDaniel |
| 11,267,919 | B2 | 3/2022 | Praetorius |
| 11,339,279 | B2 | 5/2022 | Ding |
| 2003/0027950 | A1* | 2/2003 | Uchino ............... C08F 10/00 526/90 |
| 2005/0288461 | A1 | 12/2005 | Jensen |

OTHER PUBLICATIONS

Brunauer, et al., "Adsorption of Gases in Multimolecular Layers," Journal of the American Chemical Society. 1938, vol. 60, pp. 309-319.

Film Extrusion Manual—Process, Materials, Properties, TAPPI Press, 1992, 16 pages.

George Halsey, "Physical Adsorption on Non-Uniform Surfaces," Journal Chem. Phys., vol. 16, Mar. 9, 1948, pp. 931-937.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

IUPAC Compendium of Chemical Terminology, 2nd Ed. 1997, pp. 1-1670.

Janzen, et al., "Diagnosing Long-Chain Branching in Polyethylene," Journal of Mol. Struct., 485/486, 1999, pp. 569-584.

John Landers, et al., "Density Functional Theory Methods for Characterization of Porous Materials," Colloids and Surfaces A: Physicochemical and Engineering Aspects, 437, 2013, pp. 3-32.

Modern Plastics Encyclopedia, Mid-Nov. 1995 Issue, vol. 72, No. 12, 3 pages.

International Search Report and Written Opinion issued in related PCT Application No. PCT/US2022/080955, dated Apr. 6, 2023, 12 pp.

Takao Tayano, et al., "Morphology control of clay-mineral particles as supports for metallocene catalysts in propylene polymerization", Polyolefins Journal, Jun. 30, 2016 (Jun. 30, 2016), pp. 79-92, XP093031232, DOI: 10.22063/poj.2016.1291, Retrieved from the Internet: URL:http://poj.ippi.ac.ir/article_1291_c35 5dfcae 15c711f05f70524120eeeb2.pdf [retrieved on Mar. 13, 2023].

* cited by examiner

MODIFICATIONS OF SULFATED BENTONITES AND USES THEREOF IN METALLOCENE CATALYST SYSTEMS FOR OLEFIN POLYMERIZATION

REFERENCE TO RELATED APPLICATION

This application claims the benefit of U.S. Provisional Patent Application No. 63/290,088, filed on Dec. 16, 2021, the disclosure of which is incorporated herein by reference in its entirety.

FIELD OF THE INVENTION

The present disclosure generally relates to modifying sulfated bentonites, and more particularly, relates to the use of metallocene-based catalyst systems containing modified sulfated bentonite supports in olefin polymerization processes.

BACKGROUND OF THE INVENTION

There are many activators, such as aluminoxanes, organoborons, ionizing ionic compounds, and chemically-treated solid oxides, that can be used in metallocene catalyst systems to polymerize olefins, and in particular, ethylene. However, there is a need for additional solid activators that provide acceptable catalytic activity in olefin polymerization processes. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect, the present invention discloses sulfated bentonite compositions that are characterized by a total pore volume from 0.4 to 1 mL/g, a total BET surface area from 200 to 400 m$^2$/g, and an average pore diameter from 55 to 100 Ang (Angstroms). In another aspect, the present invention discloses sulfated bentonite compositions that are characterized by a d50 average particle size in a range from 15 to 50 μm and a ratio of d90/d10 from 3 to 15. In yet another aspect, the present invention discloses sulfated bentonite compositions that comprise a sulfated bentonite and from 0.2 to 10 mmol of zinc, phosphorus, or both zinc and phosphorus, per g of the sulfated bentonite. In still another aspect, the present invention discloses a sulfated bentonite composition comprising a sulfated bentonite and from 10 to 90 wt. % of colloidal particles, based on the sulfated bentonite composition.

Catalyst compositions also are provided herein, and such catalyst compositions can comprise a metallocene compound, a co-catalyst, and any of the sulfated bentonite compositions disclosed herein. Polymerization processes using the catalyst compositions can comprise contacting the catalyst composition with an olefin monomer and an optional olefin comonomer in a polymerization reactor system under polymerization conditions to produce an olefin polymer.

Ethylene-based polymers produced by the polymerization processes can have a Mw in a range from 350 to 700 kg/mol, a ratio of Mw/Mn in a range from 2 to 4, a ratio of Mz/Mw in a range from 1.8 to 4, a CY-a parameter in a range from 0.4 to 0.65, and (a) in some aspects, a relaxation time as a function of Mz that is greater than $9.818 \times 10^{-7} (Mz)^2 + 0.001503(Mz) - 0.5$, wherein Mz is in kg/mol and the relaxation time is in sec, and (b) in other aspects, a viscosity at 0.1 sec$^{-1}$ as a function of Mz that is greater than $0.0985 (Mz)^2 + 890.7(Mz) - 300,000$, wherein Mz is in kg/mol and the viscosity is in Pa-sec.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
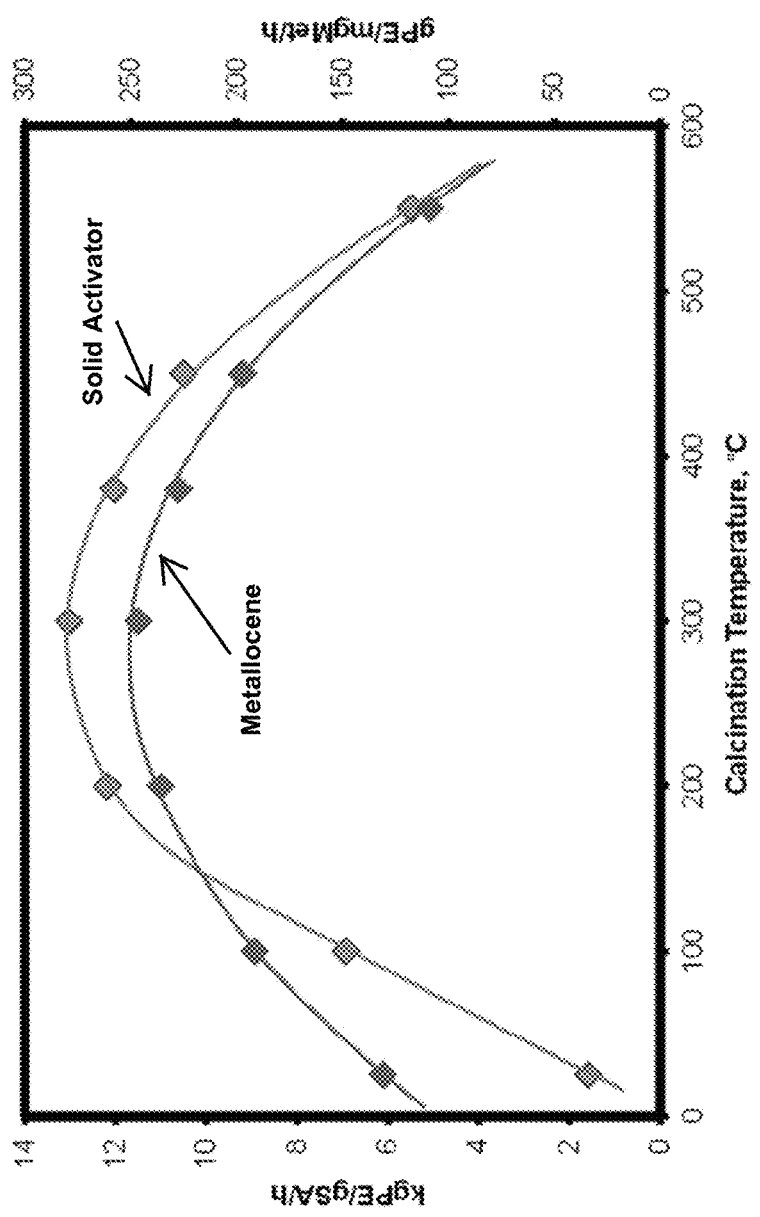
FIG. 1 presents a plot of catalyst activities versus the heat treatment temperature of the sulfated bentonite for Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied.

To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; a metallocene compound, a co-catalyst, and a sulfated bentonite composition.

The terms "a," "an," "the," etc., are intended to include plural alternatives, e.g., at least one, unless otherwise specified. For instance, the disclosure of "a co-catalyst" or "a metallocene compound" is meant to encompass one, or mixtures or combinations of more than one, co-catalyst or metallocene compound, respectively, unless otherwise specified.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to a sulfated bentonite activator/composition. The term "co-catalyst" is used regardless of the actual function of the compound or any chemical mechanism by which the compound may operate.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, metallocene compound, or solid activator, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The terms "contacting" and "combining" are used herein to describe compositions, processes, and methods in which the materials or components are contacted or combined together in any order, in any manner, and for any length of time, unless otherwise specified. For example, the materials or components can be blended, mixed, slurried, dissolved, reacted, treated, compounded, or otherwise contacted or combined in some other manner or by any suitable method or technique.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the total pore volume of a sulfated bentonite composition consistent with aspects of this invention. By a disclosure that the pore volume can be in a range from 0.4 to 1 mL/g, the intent is to recite that the pore volume can be any amount in the range and, for example, can include any range or combination of ranges from 0.4 to 1 mL/g, such as from 0.4 to 0.8 mL/g, from 0.42 to 0.7 mL/g, from 0.45 to 0.8 mL/g, or from 0.45 to 0.7 mL/g, and so forth. Likewise, all other ranges disclosed herein should be interpreted in a manner similar to these examples.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

The present invention relates generally to sulfated bentonite activators, catalyst compositions employing these solid activator-supports, methods for preparing the catalyst compositions, methods for using the catalyst compositions to polymerize olefins, the polymer resins produced using such catalyst compositions, and articles of manufacture produced from these polymer resins.

Generally, sulfated bentonite materials are poor activators in metallocene-based catalyst systems for ethylene polymerization processes. The resultant catalytic activity is unacceptably low. However, the sulfated bentonite starting material is modified herein to form sulfated bentonite compositions that have excellent catalytic activity for the production of ethylene-based homopolymers and copolymers.

Sulfated Bentonite Compositions

Disclosed herein are sulfated bentonite compositions. A first sulfated bentonite composition can be characterized by a total pore volume from 0.4 to 1 mL/g, a total BET surface area from 200 to 400 $m^2/g$, and an average pore diameter from 55 to 100 Ang (Angstroms). Other suitable ranges for the total pore volume include, but are not limited to, from 0.4 to 0.8 mL/g, from 0.42 to 0.7 mL/g, from 0.45 to 0.8 mL/g, from 0.45 to 0.7 mL/g, and the like. Likewise, other suitable ranges for the total BET surface area include, but are not limited to, from 225 to 375 $m^2/g$, from 240 to 360 $m^2/g$, from 250 to 350 $m^2/g$, and the like, and other suitable ranges for the average pore diameter include, but are not limited to, from 55 to 90 Ang, from 55 to 85 Ang, from 60 to 90 Ang, from 60 to 85 Ang, and the like. Average pore diameter (Ang) is equal to (40,000*PV/SA)—where PV is the total pore volume (mL/g), and SA is the total BET surface area ($m^2/g$).

Generally, the first sulfated bentonite composition can be characterized by having a percentage of the total pore volume in pores with diameters of greater than or equal to 60 Ang in a range from 18 to 95%, such as from 18 to 85%, from 25 to 90%, or from 25 to 85%. Additionally or alternatively, the first composition can have from 0.08 to 0.5 mL/g, from 0.1 to 0.5 mL/g, from 0.8 to 0.4 mL/g, or from 0.1 to 0.38 mL/g, of pore volume in pores with diameters of greater than or equal to 60 Ang.

The first sulfated bentonite composition also can be characterized by having a percentage of the total BET surface area in pores with diameters of greater than or equal to 60 Ang in a range from 7 to 60%, from 7 to 55%, from 9 to 57%, or from 9 to 53%. Additionally or alternatively, the first composition can have from 15 to 150 $m^2/g$, from 15 to 120 $m^2/g$, from 20 to 130 $m^2/g$, or from 22 to 120 $m^2/g$, of surface area in pores with diameters of greater than or equal to 60 Ang.

As compared to sulfated bentonite, the first sulfated bentonite composition has a greater pore volume and larger diameter pores. Beneficially, large pore diameter catalysts can significantly increase catalytic activity.

Also encompassed herein is a second sulfated bentonite composition characterized by a d50 average particle size in a range from 15 to 50 μm and a ratio of d90/d10 from 3 to 15. Other suitable ranges for the d50 average particle size of the composition include, but are not limited to, from 15 to 40 μm, from 17 to 45 μm, from to 40 μm, and the like, and other suitable ranges for the ratio of d90/d10 of the composition include, but are not limited to, from 3 to 14, from 3 to 12, from 4 to 15, from 4 to 12, and the like.

The second sulfated bentonite composition also can be characterized by a particle size span ((d90-d10)/d50) in a range from 1 to 3.2 in one aspect, from 1.1 to 2.8 in another aspect, from 1.2 to 2.7 in yet another aspect, and from 1.3 to 2.6 in still another aspect. Additionally or alternatively, the second composition can have a d10 particle size in a range from 4 to 25 μm, such as from 4 to 22 μm, from 4.5 to 22 μm, or from 5 to 20 μm. Additionally or alternatively, the second composition can be characterized by a ratio of d90/d50 in a range from 1.5 to 3.5, such as from 1.5 to 3, from 1.6 to 3.2, from 1.7 to 3, or from 1.8 to 2.7.

In one aspect, the first sulfated bentonite composition can be further characterized by any of the features disclosed herein for the second bentonite composition, while in another aspect, the second sulfated bentonite composition can be further characterized by any of the features disclosed herein for the first bentonite composition.

A third sulfated bentonite composition is provided herein, and this third composition can comprise a sulfated bentonite and from 0.2 to 10 mmol/g of zinc and/or phosphorus. Thus, the third composition can contain from 0.2 to 10 mmol/g of zinc, from 0.2 to 10 mmol/g of phosphorus, or from 0.2 to 10 mmol/g of both zinc and phosphorus. Other suitable amounts of zinc (or phosphorus) in the third composition can include, but are not limited to, from 0.3 to 8, from 0.5 to 5, from 0.8 to 4, from 1 to 5, or from 1.5 to 3.5 mmol/g. These amounts of zinc and/or phosphorus (mmol) are based on the weight (g) of the sulfated bentonite.

Sulfated bentonite is an acidic clay, and often can be referred to as an acidic bentonite or acid-treated bentonite. Typically, sulfated bentonite is a sulfuric acid-washed bentonite (or montmorillonite), and the sulfated bentonite can be prepared by any suitable procedure, such as described in U.S. Pat. No. 2,470,872. Suitable sulfated bentonites generally have residual acidity values (mg KOH/g at the phenolphthalein endpoint) of from 3 to 14, and approximately 3-6 wt. % Ca, 28-32 wt. % Si, 0.08-0.14 wt. % Na, 0.1-0.3 wt. % Sr, 2.8-4.8 wt. % S, and 0.5-0.75 wt. % Ti (via XRF). Thus, any sulfated bentonites or sulfated bentonite compositions disclosed herein can be further characterized by a residual acidity value of from 3 to 14 mg KOH/g at the phenolphthalein endpoint; additionally or alternatively, a calcium content of from 2 to 7 wt. %, from 3 to 6 wt. %, or from 3.5 to 6 wt. %; additionally or alternatively, a silicon content of from 25 to 35 wt. %, from 27 to 33 wt. %, or from 28 to 32 wt. %; additionally or alternatively, a sodium content of from 0.05 to 0.5 wt. %, from 0.07 to 0.25 wt. %, or from 0.08 to 0.14 wt. %; additionally or alternatively, a strontium content of from 0.05 to 0.5 wt. %, from 0.08 to 0.35 wt. %, or from 0.1 to 0.3 wt. %; additionally or alternatively, a sulfur content of from 2 to 6 wt. %, from 2.5 to 5 wt. %, or from 2.8 to 4.8 wt. %; and additionally or alternatively, a titanium content of from 0.25 to 1 wt. %, from 0.4 to 0.8 wt. %, or from 0.5 to 0.75 wt. %. Elemental amounts are determined by XRF.

Additionally, the third sulfated bentonite composition can be further characterized by any of the features disclosed herein for the first bentonite composition and/or by any of the features disclosed herein for the second sulfated bentonite composition.

A fourth sulfated bentonite composition is provided herein, and this fourth composition can comprise a sulfated bentonite and from 10 to 90 wt. % of colloidal particles, based on the total weight of the fourth composition. In one aspect, the fourth composition can contain from 15 to 80 wt. % of colloidal particles, and in another aspect, the fourth composition can contain from 20 to 70 wt. % of colloidal particles, and in yet another aspect, the fourth composition can contain from 25 to 60 wt. % of colloidal particles, and in still another aspect, the fourth composition can contain from to 50 wt. % of colloidal particles.

Any suitable colloidal particles can be present in the fourth composition. For instance, the colloidal particles can comprise a colloidal silica. Additionally or alternatively, the colloidal particles can comprise a colloidal aluminum-zirconium. Moreover, the fourth sulfated bentonite composition can be further characterized by any of the features disclosed herein for the first bentonite composition and/or by any of the features disclosed herein for the second sulfated bentonite composition.

Catalyst Compositions

Catalyst compositions encompassed herein can comprise a metallocene compound, a co-catalyst, and any of the first, second, third, or fourth sulfated bentonite compositions disclosed herein. Likewise, processes for producing a catalyst composition encompassed herein can comprise contacting a metallocene compound, a co-catalyst, and any of the first, second, third, or fourth sulfated bentonite compositions disclosed herein, to produce the catalyst composition. The components of the catalyst composition can be contacted or combined in any order, but often the (first, second, third, or fourth) sulfated bentonite composition is contacted first with a co-catalyst (e.g., an organoaluminum co-catalyst or an organozinc co-catalyst) for a suitable pre-contact time to form a pre-contacted mixture, and the pre-contacted mixture is then contacted with the metallocene compound to produce the catalyst composition.

In one aspect, prior to the contacting step to form the catalyst composition, the process for producing the catalyst composition can further comprise a step of heat treating the (first, second, third, or fourth) sulfated bentonite composition at a suitable temperature, such as from 100° C. to 500° C., from 100° C. to 400° C., from 100° C. to 350° C., or from 200° C. to 400° C.

In another aspect, the process for producing the catalyst composition can further comprise a step of heat treating the (first, second, third, or fourth) sulfated bentonite composition at a temperature of less than or equal to 200° C., less than or equal to 100° C., or less than or equal to 50° C., prior to the contacting step. Unexpectedly, it was found that polymers having higher CY-a parameters can be produced using catalyst compositions in which the sulfated bentonite composition was heat treated at a low temperature prior to formation of the catalyst composition.

In yet another aspect, the process for producing the catalyst composition can further comprise a step of microwave treating the (first, second, third, or fourth) sulfated bentonite composition for a suitable period of time, such as from 10 sec to 10 min, from 30 sec to 5 min, or from 30 sec to 2 min, and the like, prior to the contacting step.

Prior to heat treating or microwave treating, in one aspect, the process for producing the catalyst composition can further comprise a step of impregnating the sulfated bentonite composition with zinc, phosphorus, or a combination thereof. In another aspect, the process for producing the catalyst composition can further comprise, prior to heat treating or microwave treating, a step of adjusting a pH of a mixture of the sulfated bentonite composition in water to less than or equal to 3, less than or equal to 2, or less than or equal to 1, then subjecting the low pH mixture to a temperature in a range from 50° C. to 95° C. In yet another aspect, the process for producing the catalyst composition can further comprise, prior to heat treating or microwave treating, a step of sonicating a mixture of the sulfated bentonite composition in water, then adding an alcohol compound to re-agglomerate the sulfated bentonite composition. A modified sulfated bentonite product prepared by this process (sonicating a mixture of the sulfated bentonite composition in water, then adding an alcohol compound to re-agglomerate the sulfated bentonite composition) also is encompassed herein. Optionally, a colloidal silica, a colloidal aluminum-zirconium, PBu$_4$OH, adamantyl amine, or a combination thereof, can be added to the mixture of the sulfated bentonite composition in water while sonicating. A modified sulfated bentonite product prepared by this process (sonicating a mixture of the sulfated bentonite composition in water with a colloidal silica, a colloidal aluminum-zirconium, PBu$_4$OH, adamantyl amine, or a combination thereof, then adding an alcohol compound to re-agglomerate the sulfated bentonite composition) also is encompassed herein.

In still another aspect, the process for producing the catalyst composition can further comprise, prior to heat treating or microwave treating, a step of air classifying the sulfated bentonite composition to remove a portion of the larger and smaller particles.

Also encompassed herein are catalyst compositions prepared by the any of the processes disclosed herein, e.g., contacting the components in any order, pre-contacting with an organoaluminum co-catalyst or an organozinc co-catalyst, heat treating the sulfated bentonite or sulfated bentonite composition at any suitable temperature, microwave treating the sulfated bentonite or sulfated bentonite composition for any suitable period of time, impregnating the sulfated bentonite or sulfated bentonite composition with zinc and/or phosphorus, adjusting a pH of a mixture of the sulfated bentonite or sulfated bentonite composition in water to a low pH and then subjecting the low pH mixture to a temperature in a range from 50° C. to 95° C., sonicating a mixture of the sulfated bentonite or sulfated bentonite composition in water and then adding an alcohol compound to re-agglomerate the sulfated bentonite composition (optionally, with a colloidal silica, a colloidal aluminum-zirconium, PBu$_4$OH, adamantyl amine, or a combination thereof, added to the mixture of the sulfated bentonite or sulfated bentonite composition in water while sonicating), or air classifying the sulfated bentonite or sulfated bentonite composition to remove a portion of the larger and smaller particles, or any combination of these steps.

In any of the catalyst compositions and methods for the preparation of the catalyst composition disclosed herein, the co-catalyst can comprise an organoaluminum compound, an organozinc compound, an aluminoxane compound, an organoboron or organoborate compound, an ionizing ionic compound, or any combination thereof. Examples of aluminoxane, organoboron or organoborate, and ionizing ionic activators are disclosed in, for instance, U.S. Pat. Nos. 3,242,099, 4,794,096, 4,808,561, 5,576,259, 5,807,938, 5,919,983, and 8,114,946. While not being limited thereto, representative organoaluminum compounds can include trimethylaluminum (TMA), triethylaluminum (TEA), tri-n-propylaluminum, tri-n-butylaluminum, triisobutylaluminum (TIBA), tri-n-hexylaluminum, tri-n-octylaluminum, diisobutylaluminum hydride, diethylaluminum ethoxide, diethylaluminum chloride, and the like, as well as any combination thereof. Exemplary organozinc compounds) that can be used as co-catalysts can include, but are not limited to, dimethylzinc, diethylzinc (DEZ), dipropylzinc, dibutylzinc, dineopentylzinc, di(trimethylsilyl)zinc, di(triethylsilyl)zinc, di(triisoproplysilyl)zinc, di(triphenylsilyOzinc, di(allyldimethylsilyl)zinc, di(trimethylsilylmethyl)zinc, and the like, or combinations thereof. Accordingly, in an aspect of this invention, the co-catalyst in the catalyst composition (or used in the method for preparing the catalyst composition) can comprise an organoaluminum compound (e.g., TIBA), an organozinc compound (e.g., DEZ), or both.

It is contemplated herein that the catalyst composition can comprise a metallocene compound (one or more), a sulfated bentonite composition, and a co-catalyst (e.g., an organoaluminum compound), wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of the metallocene compound (one or more), the sulfated bentonite composition, and the organoaluminum compound, wherein no other materials are present in the catalyst composition which would increase/decrease the activity of the catalyst composition by more than 10% from the catalyst activity of the catalyst composition in the absence of said materials.

While not limited thereto, the weight ratio of the metallocene compound (or compounds) to the sulfated bentonite composition can range from 1:1 to 1:100,000 in one aspect, from 1:10 to 1:10,000 in another aspect, from 1:20 to 1:1000 in yet another aspect, and from 1:50 to 1:500 in still another aspect. If two or more of any of these components are present, then these ratios are based on the total weight of each respective type of component.

Consistent with this disclosure, the catalyst composition can contain a single metallocene compound, for example, any suitable bridged metallocene compound or any suitable unbridged metallocene compound, or any bridged metallocene compound or any unbridged metallocene compound disclosed herein. Alternatively, the catalyst composition can be a dual catalyst system. In such instances, the catalyst composition can contain metallocene component I comprising any suitable unbridged metallocene compound or any disclosed herein and metallocene component II comprising any suitable bridged metallocene compound or any disclosed herein, or the dual catalyst system can contains two different bridged metallocene compounds, or the dual catalyst system can contain two different unbridged metallocene compounds. Whether the catalyst compositions contains a single metallocene compound, two metallocene compounds, or more than two metallocene compounds, the catalyst composition also can contain any suitable sulfated bentonite composition or any sulfated bentonite composition disclosed herein (one or more than one), and any suitable co-catalyst or any co-catalyst disclosed herein (one or more than one).

Referring first to aspects in which the catalyst composition contains an unbridged metallocene compound, the unbridged metallocene compound often can comprise an unbridged zirconium or hafnium based metallocene compound containing two cyclopentadienyl groups, two indenyl groups, or a cyclopentadienyl and an indenyl group. In one aspect, the unbridged metallocene compound can comprise an unbridged zirconium or hafnium based metallocene compound containing two cyclopentadienyl groups. In another aspect, the unbridged metallocene compound can comprise an unbridged zirconium or hafnium based metallocene compound containing two indenyl groups. In yet another aspect, the unbridged metallocene compound can comprise an unbridged zirconium or hafnium based metallocene compound containing a cyclopentadienyl group and an indenyl group. In still another aspect, the unbridged metallocene compound can comprise an unbridged zirconium based metallocene compound containing an alkyl-substituted cyclopentadienyl group and an alkenyl-substituted indenyl group.

Illustrative and non-limiting examples of unbridged metallocene compounds suitable for use in catalyst compositions of this invention can include the following compounds (Ph=phenyl):

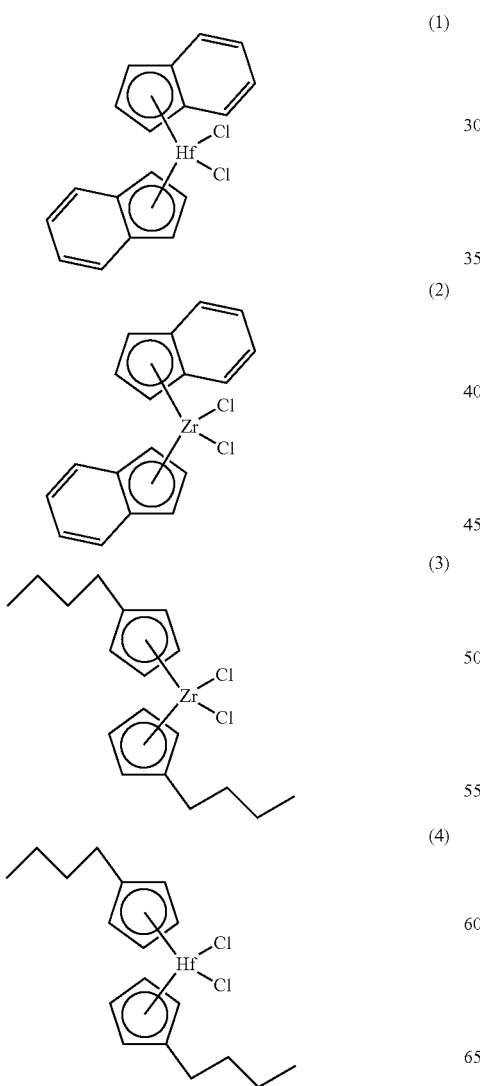

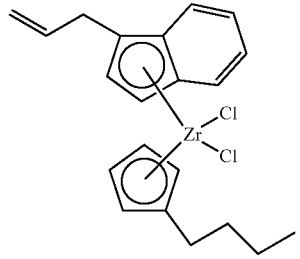

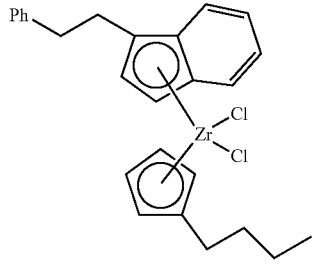

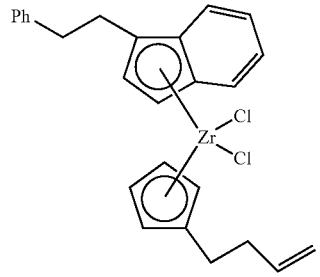

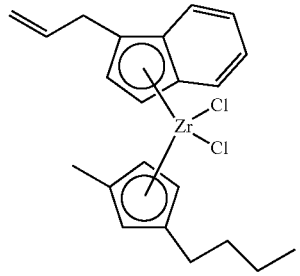

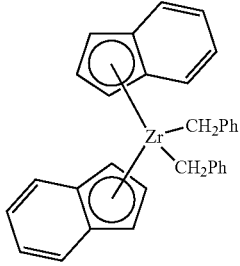

(10)

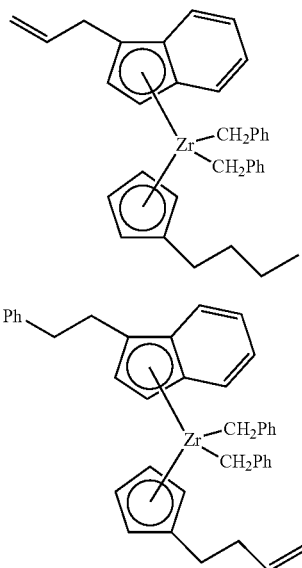

(11)

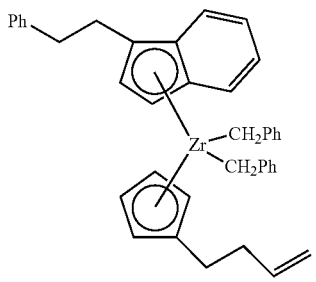

and the like, as well as combinations thereof.

The catalyst composition is not limited solely to unbridged metallocene compounds such as described above. Other suitable unbridged metallocene compounds are disclosed in U.S. Pat. Nos. 7,199,073, 7,226,886, 7,312,283, and 7,619,047.

Referring now to aspects in which the catalyst composition contains a bridged metallocene compound, the bridged metallocene compound, in one aspect, can comprise a bridged zirconium or hafnium based metallocene compound. In another aspect, the bridged metallocene compound can comprise a bridged zirconium or hafnium based metallocene compound with an alkenyl substituent. In yet another aspect, the bridged metallocene compound can comprise a bridged zirconium or hafnium based metallocene compound with an alkenyl substituent and a fluorenyl group. In still another aspect, the bridged metallocene compound can comprise a bridged zirconium or hafnium based metallocene compound with a cyclopentadienyl group and a fluorenyl group, and with an alkenyl substituent on the bridging group and/or on the cyclopentadienyl group. Further, the bridged metallocene compound can comprise a bridged metallocene compound having an aryl group substituent on the bridging group.

Illustrative and non-limiting examples of bridged metallocene compounds suitable for use in catalyst compositions of this invention can include the following compounds (Me=methyl, Ph=phenyl; t-Bu=tert-butyl):

(14)

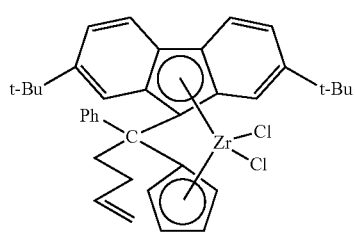

(15)

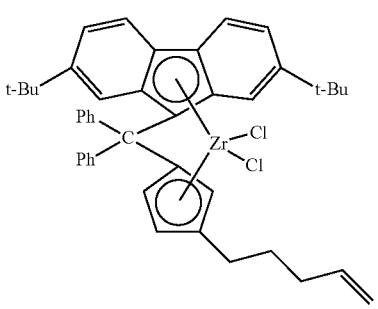

(16)

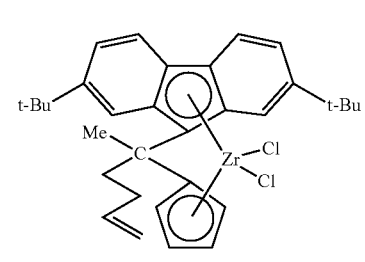

(17)

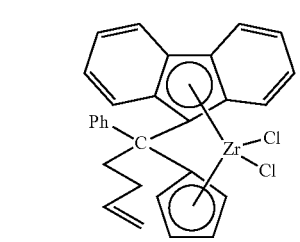

(18)

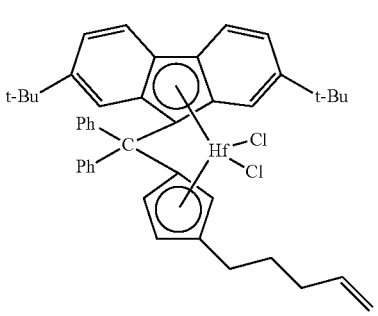

(19)

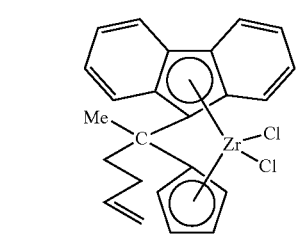

(20)

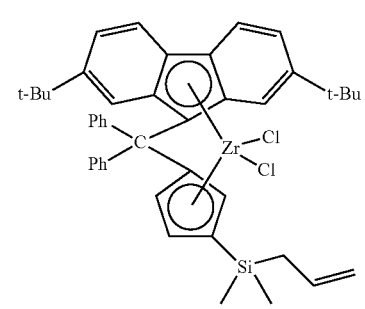

-continued

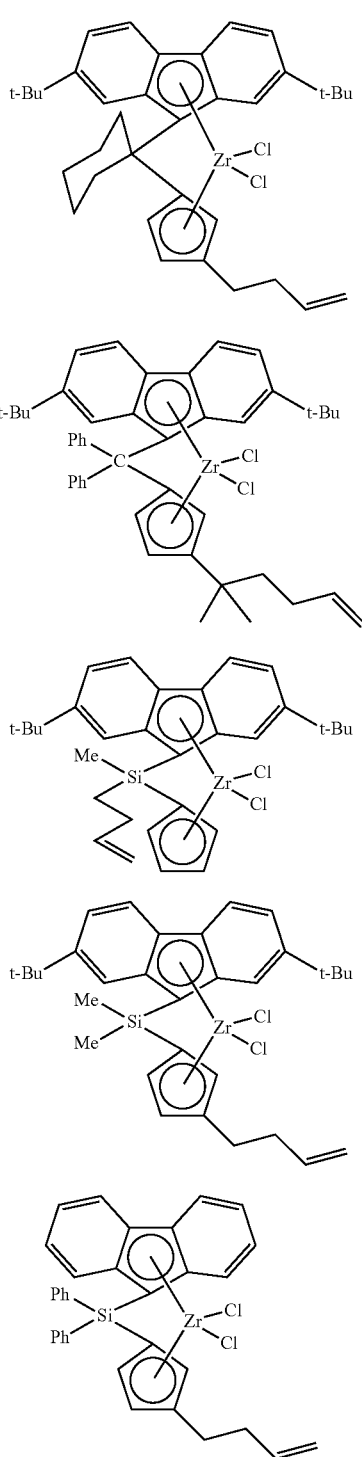

and the like, as well as combinations thereof.

The catalyst composition is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047.

When two metallocene compounds are present in the catalyst composition, the weight ratio of metallocene component I to metallocene component II in the catalyst composition can be in a range from 10:1 to 1:10, from 8:1 to 1:8, from 5:1 to 1:5, from 4:1 to 1:4, from 3:1 to 1:3; from 2:1 to 1:2, from 1.5:1 to 1:1.5, from 1.25:1 to 1:1.25, or from 1.1:1 to 1:1.1.

Catalyst compositions of the present invention generally have a catalyst activity greater than 150 grams of ethylene polymer (homopolymer and/or copolymer, as the context requires) per gram of sulfated bentonite composition per hour (abbreviated g/g/hr). In another aspect, the catalyst activity can be greater than 250, greater than 350, or greater than 500 g/g/hr. Yet, in another aspect, the catalyst activity can be greater than 700 g/g/hr, greater than 1000 g/g/hr, or greater than 2000 g/g/hr, and often as high as 10,000-15,000 g/g/hr. Illustrative and non-limiting ranges for the catalyst activity include from 150 to 10,000, from 500 to 12,500, or from 1000 to 15,000 g/g/hr, and the like. These activities are measured under slurry polymerization conditions, with a triisobutylaluminum co-catalyst, using isobutane as the diluent, at a polymerization temperature of 90° C. and a reactor pressure of 400 psig (2.8 MPa).

Polymerization Processes

Olefin polymers (e.g., ethylene polymers) can be produced from the disclosed catalyst compositions using any suitable polymerization process using various types of polymerization reactors, polymerization reactor systems, and polymerization reaction conditions. A polymerization process can comprise contacting any catalyst composition disclosed herein with an olefin monomer and an optional olefin comonomer in a polymerization reactor system under polymerization conditions to produce an olefin polymer. Another polymerization process can comprise performing any process to produce a catalyst composition disclosed herein, and contacting the catalyst composition with an olefin monomer and an optional olefin comonomer in a polymerization reactor system under polymerization conditions to produce an olefin polymer. This invention also encompasses any olefin polymers (e.g., ethylene polymers) produced by the polymerization processes disclosed herein.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the catalyst compositions and in the polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof alternatively, the comonomer can comprise 1-butene; alternatively, the comonomer can comprise 1-hexene; or alternatively, the comonomer can comprise 1-octene.

Olefin Polymers

This invention is also directed to, and encompasses, the olefin polymers produced by any of the polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

The densities of ethylene-based polymers disclosed herein often are greater than or equal to 0.90 g/cm$^3$, and less than or equal to 0.97 g/cm$^3$. Yet, in particular aspects, the density can be in a range from 0.91 to 0.965 g/cm$^3$, from 0.92 to 0.96 g/cm$^3$, from 0.93 to 0.955 g/cm$^3$, or from 0.94 to 0.955 g/cm$^3$. While not being limited thereto, the ethylene polymer can have a high load melt index (HLMI) in a range from 0 to 100 g/10 min; alternatively, from 1 to 80 g/10 min; alternatively, from 2 to 40 g/10 min; alternatively, from 2 to 30 g/10 min; alternatively, from 1 to 20 g/10 min; or alternatively, from 50 to 100 g/10 min. In an aspect, ethylene polymers described herein can have a ratio of Mw/Mn, or the polydispersity index, in a range from 2 to 40, from 5 to 40, from 7 to 25, from 8 to 15, from 2 to 10, from 2 to 6, or from 2 to 4. Additionally or alternatively, the ethylene polymer can have a weight-average molecular weight (Mw) in a range from 75,000 to 700,000, from 75,000 to 200,000, from 100,000 to 500,000, from 150,000 to 350,000, or from 200,000 to 320,000 g/mol. Moreover, the olefin polymers can be produced with a single or dual metallocene catalyst system containing zirconium and/or hafnium. In such instances, the olefin or ethylene polymer can contain no measurable amount of Mg, V, Ti, and Cr, i.e., less than 0.1 ppm by weight. In further aspects, the olefin or ethylene polymer can contain, independently, less than 0.08 ppm, less than 0.05 ppm, or less than 0.03 ppm, of Mg, V, Ti, and Cr.

An illustrative and non-limiting example of first ethylene polymer (e.g., an ethylene/α-olefin copolymer) consistent with aspects of this invention can have (or can be characterized by) a Mw in a range from 350 to 700 kg/mol, a ratio of Mw/Mn in a range from 2 to 4, a ratio of Mz/Mw in a range from 1.8 to 4, a CY-a parameter in a range from 0.4 to 0.65, and a relaxation time as a function of Mz that is greater than $9.818 \times 10^{-7}$ (Mz)$^2$+0.001503(Mz)−0.5, wherein Mz is in kg/mol and the relaxation time is in sec. An illustrative and non-limiting example of second ethylene polymer (e.g., an ethylene/α-olefin copolymer) consistent with aspects of this invention can have (or can be characterized by) a Mw in a range from 350 to 700 kg/mol, a ratio of Mw/Mn in a range from 2 to 4, a ratio of Mz/Mw in a range from 1.8 to 4, a CY-a parameter in a range from 0.4 to 0.65, and a viscosity at 0.1 sec$^{-1}$ as a function of Mz that is greater than 0.0985(Mz)$^2$+890.7(Mz)−300,000, wherein Mz is in kg/mol and the viscosity is in Pa-sec. These illustrative and non-limiting examples of ethylene polymers also can have any of the polymer properties listed below and in any combination, unless indicated otherwise.

While not limited thereto, the Mw of the first ethylene polymer and the second ethylene polymer, independently, can fall within a range from 400 to 700 kg/mol; alternatively, from 400 to 600 kg/mol; or alternatively, from 450 to 600 kg/mol. Likewise, the ratio of Mw/Mn of the first ethylene polymer and the second ethylene polymer, independently, can range from 2 to 3.5, from 2 to 3, from 2.2 to 3.5, from 2.2 to 3.2, or from 2.2 to 3, while the ratio of Mz/Mw of the first ethylene polymer and the second ethylene polymer, independently, can range from 1.8 to 3, from 1.8 to 2.7, from 2 to 4, from 2 to 3, or from 2 to 2.8.

These polymers also can be characterized by the Carreau-Yasuda (CY) model. Thus, independently, the CY-a parameter of the first ethylene polymer and the second ethylene polymer can range from 0.4 to 0.65. In some aspects, the CY-a parameter of the first ethylene polymer and the second ethylene polymer, independently, can range from 0.4 to 0.6, from 0.45 to 0.65, or from 0.45 to 0.6, while in other aspects, the CY-a parameter of the first ethylene polymer and the second ethylene polymer, independently, can range from 0.48 to 0.58, from 0.5 to 0.6, or from 0.5 to 0.58.

The density of the first ethylene-based polymer and the second ethylene-based polymer is not particularly limited, but generally ranges, independently, from 0.90 to 0.96 g/cm$^3$. Accordingly, representative ranges for the density of the first ethylene polymer and/or the second ethylene polymer can include from 0.91 to 0.96 g/cm$^3$, from 0.91 to 0.94 g/cm$^3$, from 0.91 to 0.93 g/cm$^3$, from 0.92 to 0.95 g/cm$^3$, or from 0.92 to 0.94 g/cm$^3$, and the like. Polymer density can be determined on a compression molded sample, cooled at 15° C. per minute, and conditioned for 40 hr at room temperature in accordance with ASTM D1505 and ASTM D4703.

While not being limited thereto, the first ethylene polymer and the second ethylene polymer, independently, can have a high load melt index (HLMI) in a range from 0 to 80 g/10 min; alternatively, from 0 to 25 g/10 min; alternatively, from 0 to 10 g/10 min; alternatively, from 1 to 50 g/10 min; alternatively, from 5 to 25 g/10 min; or alternatively, from 10 to 75 g/10 min.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992.

In some aspects of this invention, an article of manufacture can comprise any of olefin polymers (or ethylene polymers) described herein, and the article of manufacture can be or can comprise a film, such as a blown film; alternatively, a pipe product; or alternatively, a blow molded product, such as a blow molded bottle.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Unless otherwise indicated, the polymerization experiments used in the following examples were conducted for 30 min in a one-gallon (3.8 L) stainless-steel autoclave reactor containing isobutane as diluent. First, approximately 0.15 g of the solid activator-support was added to the reactor, followed by 0.4 mL of 1M TIBA (in hexane), then 0.8 to 3 mg of a metallocene compound (methyl(buten-3-yl) methylidene ($\eta$5-cyclopentadien-1-ylidene) ($\eta$5-2,7-di-tert-butylfluoren-9-ylidene) zirconium dichloride) via a 1 mg/mL toluene solution of the metallocene compound, followed by isobutane. At the desired polymerization temperature of 90° C., ethylene was charged to the reactor and fed on demand to maintain the target pressure of 400 psig (2.8 MPa) (no hydrogen or comonomer was used). The reactor was maintained at the target temperature throughout the experiment by an automated heating-cooling system. After venting of the reactor, purging, and cooling, the resulting polymer product was dried under reduced pressure.

EXAMPLES A-V

Polymerization Experiments with Various Bentonite Grades

Bentonites and other natural minerals have often been used as a support for catalysts used in organic synthesis, and for adsorption of various oils or other organics. In this study, we investigated different forms of bentonite and different modifications of bentonite for use in activating metallocenes. Thus, commercial variations of natural sodium bentonite, natural calcium bentonite, and sulfate-treated bentonite were obtained from various producers, with origins from fields around the world, but most often represented from Wyoming, USA. Sources can be summarized as follows: sodium types were frequently obtained from Delta Adsorbents, calcium types from BASF, sulfate-treated types from BASF, Delta Adsorbents, and in some cases, Sigma-Aldrich Scientific.

In this study, the grade Z130 was often used, being obtained from Delta Adsorbents or BASF, and also sold under the name F-30X, similarly Z120 is available as F-20X, Z160 as CC160, and Z124 as F-24X. Another bentonite used in this study, as a control or comparison sample, was a very clean sodium form of bentonite from BPM Minerals, called National Standard bentonite. Still other bentonite suppliers included Sigma-Aldrich, MP Bio, American Colloid, Performance Minerals, US Minerals, and Southern Clay Products.

Table A summarizes results from an assortment of polymerization experiments using various bentonite types, and elemental analysis via XRF. From these experiments, it becomes clear fairly quickly that polymerizations via metallocene catalysts are most successful using the acid type of bentonite (H under Bentonite type). The best of these are treated with sulfuric acid, thus termed sulfated bentonite. While not shown in Table A, these sulfated bentonites contained 0.1-0.3 wt. % Sr and 0.5-0.75 wt. % Ti (via XRF).

Example 1

Heat Treatment of Sulfated Bentonite

FIG. 1 is a plot of catalyst activities versus the heat treatment temperature of sulfated bentonite grade Z130. Unexpectedly, and unlike certain other solid activator-supports which can require peak calcining temperatures of 600° C. or higher, the sulfated bentonites did not require a high temperature heat treatment in order to activate metallocene. In Example 1, the sulfated bentonite Z130 was used as the activator-support with varying heat treatments up to 550° C. The catalysts encompassed by FIG. 1 were made by first heat-treating the support in fluidizing dry nitrogen for 3 hours, followed by cooling and storing under nitrogen prior to use. A catalyst composition was prepared by adding the sulfated bentonite, TIBA co-catalyst, and 3 mg of the metallocene compound, in that sequence as described above in the usual procedure. Then, isobutane and ethylene were added to the reactor as it was heated to the reaction temperature of 90° C. In FIG. 1, the left axis is the activity based on the solid activator, sulfated bentonite. It is expressed in units of kg polymer/g solid activator/hr. The right axis is activity based on the metallocene compound and it is expressed in units of g polymer/mg metallocene/hr. Interestingly, in the absence of any heat treatment, the sulfated bentonite still provided about 1.6 kg polymer/g/hr of activity, which is low but still quite significant compared to other solid activators. The support activity increased as the heat-treatment temperature was raised, reaching a peak at approximately 300° C., producing about 13 kg polymer/g/hr of activity. Similarly, the metallocene activity also reached a maximum at approximately 300° C. While not wishing to be bound by theory, this heat treatment behavior may be the result of a loss of sulfate at higher temperatures, however, subsequent testing showed that adding sulfate to the sulfated bentonite starting material did not further increase the activity.

Examples 2-4

Microwave Treatment of Sulfated Bentonite

Table 1 summarizes the effect of microwave treatment on the polymerization activity of a catalyst system containing sulfated bentonite Z120. In Examples 3-4, the Z120 was subjected to a short microwave treatment instead of a heat treatment. The results of polymerization experiments using the microwave treated sulfated bentonite, performed using the same polymerization procedure as in Example 1, show a tremendous improvement in support activity when compared to a control that was not heated at all. But the activities also were greatly improved compared to another control run (Example 2 in Table 1), which was heated at 100° C. in a vacuum oven for 12 h. This control was chosen here, since in principle, this is the highest temperature the microwaved samples should have reached by boiling off residual water. However, the microwaved samples produced significantly higher polymerization activities (based on the amount of solid activator) than the heat-treated control of Example 2. While not wishing to be bound by theory, the reason may be that the microwave vaporization of intercalated water may have caused some beneficial structural rearrangement or expansion of the pore structure, resulting in improved catalytic activity.

Example 5

Metallocene to Sulfated Bentonite Ratio

Figure 2:
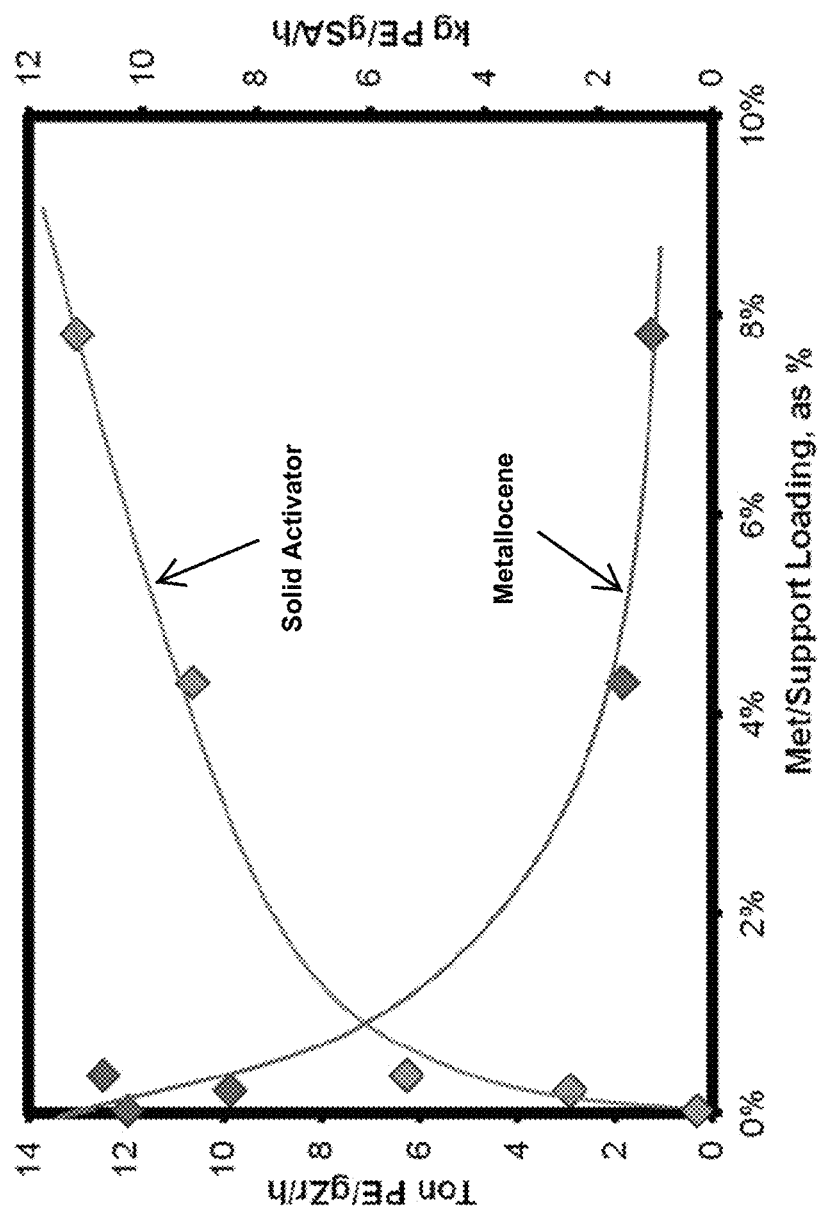
FIGS. 2-3 present plots of catalyst activities versus the weight ratio of the metallocene compound to sulfated bentonite for Example 5.
Figure 3:
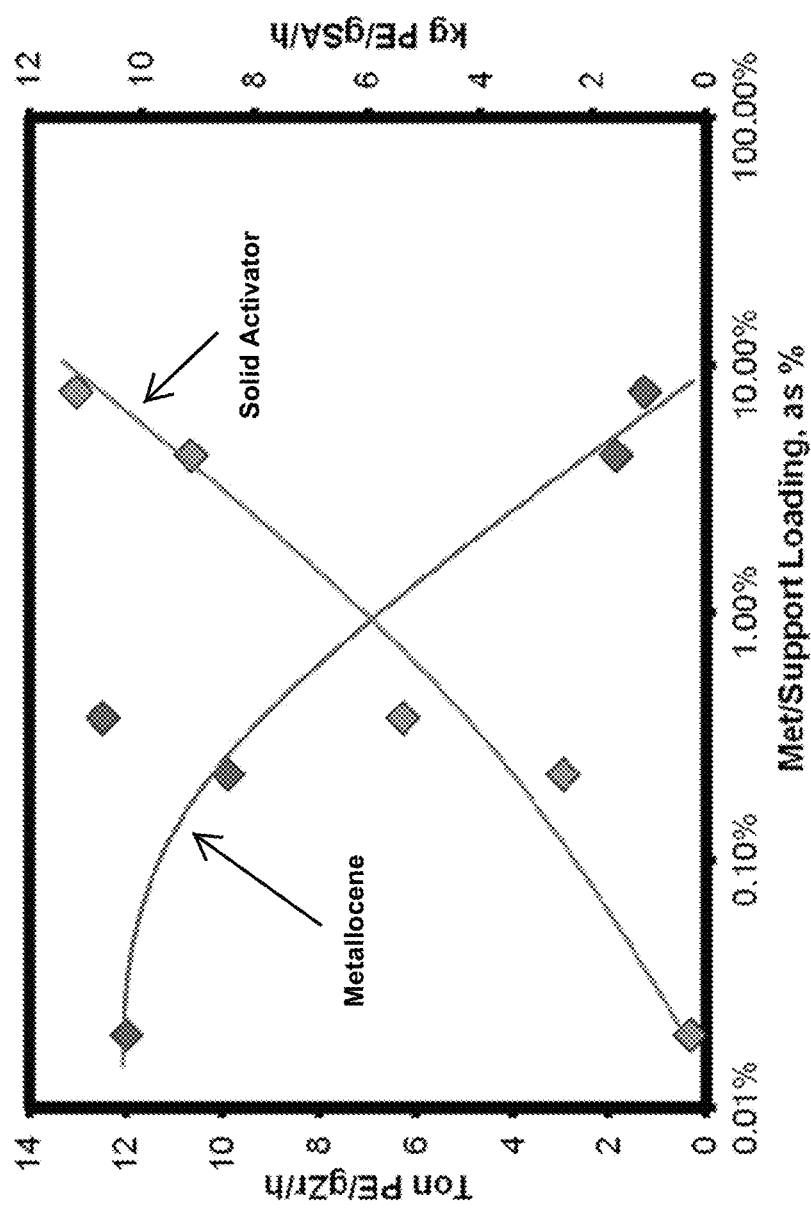

FIGS. 2-3 are plots of catalyst activities versus the weight ratio of the metallocene compound to support. Sulfated bentonite Z120 was used after being heated for 3 h at 300° C. in dry nitrogen. Both the amount of support was varied (from 0.15 to 0.07 g) and the amount of metallocene (from 0.03 mg to 3 mg). The TIBA amount was constant and equal to that used in Example 1. In FIGS. 2-3, the support activity (kg of polymer produced per gram of sulfated bentonite per hour) is plotted on the right axis and the metallocene activity (tons of polymer produced per gram of Zr per hour) is on the left axis. The same data is plotted in both figures, however, in FIG. 2 a simple linear X-axis is used, whereas in FIG. 3 a log X-axis is used. The polymerization experiments were performed using the same polymerization procedure as in Example 1, and the metallocene loading was varied from 0.02 wt. % to nearly 8 wt. %. FIG. 2 demonstrates that the support activity begins to level out as the metallocene loading increases, and also demonstrates that the metallocene activity decreases as more metallocene is present in the catalyst system.

Examples 6-19

Metal Alkyl Treatment of Sulfated Bentonite

Table 2 summarizes the effect of metal alkyl pre-treatments of the support on the catalytic activity of the resultant catalyst systems containing sulfated bentonites Z120, Z160, and Z130. In each experiment, the solid support was either used as is, or it was first heat-treated prior to the metal alkyl treatment. These metal alkyl pre-treatments were in addition to the usual addition of 0.4 mL of 1M TIBA co-catalyst that was always added to the reactor just before beginning the run. In addition to TIBA, other metals were also often used, and the pre-treatments were performed in different ways and for different times. The polymerization experiments were performed using the same polymerization procedure as in Example 1, except that the amount of the metallocene compound used was varied, as shown in Table 2. In some experiments, the sulfated bentonite was first heated, or not, and then treated with either diethyl zinc (DEZ) or triisobutyl aluminum (TIBA) to remove water. This pretreatment or pre-contacting was sometimes accomplished by first charging the reactor with about 100 mg of the sulfated bentonite. Then, 1 mL of 1M DEZ or 1M TIBA was added and the mixture was allowed to stir at 25° C. for about 5 min, followed by commencement of polymerization when the other feeds were also added.

Unexpectedly, even a very short pre-treatment was sufficient to significantly increase the support activity, in many cases, over a 100% increase was achieved. DEZ was particularly effective at increasing catalytic activity when used in this way.

On other occasions, as indicated in Table 2, a few grams of the bentonite and about 1 mL of 1M metal alkyl was added to a vial, which was allowed to stir for longer periods of time. After passage of that mixing time, the solvent was evaporated under dry nitrogen at 25° C., and a small amount of this powder, usually 100 mg, was then charged to the reactor for a polymerization test. Thus, for example, in these longer experiments in which the treatment time was 18-24 hr, 1-2 grams of the sulfated bentonite (after heat treatment, if used) was placed under nitrogen in a 25 mL sealed bottle with septum, then 3 mL of 1M DEZ or 1M TIBA was injected into the bottle and the resulting slurry was stirred at 25° C. Excess liquid was removed by syringe and the support was dried by passing nitrogen over it overnight at 25° C., followed by polymerization.

This pre-treatment also improved the activity of the support and seemingly more so than the 5 min treatments. Note that even support samples that had already been heat treated at 250-280° C., and thus likely contained no free water, also responded favorably to this pre-treatment step.

Examples 20-33

Other Treatments of Sulfated Bentonite

Table 3 summarizes the effect of other treatments on the catalytic activity of catalyst systems containing sulfated bentonites Z130 and Z124. The polymerization experiments were performed using the same polymerization procedure as in Example 1, except the amount of the metallocene compound was varied, as shown in Table 3. In some experiments, the sulfated bentonite was first impregnated with zinc nitrate prior to the heat treatment. Aqueous zinc treatments did increase the activity, much like DEZ (see Table 2). However, similar aqueous treatments with aluminum nitrate or chloride did not improve activity, which does suggest that zinc may provide some unique and beneficial modification of the sulfated bentonite.

Other experiments in Table 3 were conducted in which large high-boiling organic base molecules were added instead of zinc (e.g., adamantyl amine and tetrabutyl phosphine hydroxide). Surprisingly, these treatments also improved the activity.

Modifications to the morphology of the sulfated bentonite by the addition of silica are also summarized in Table 3. A colloidal silica solution (Grace Ludox SM-AS, primary particle size of about 5 nm) was added into a slurry of the support. When dripped into alcohol, the aqueous Ludox solution immediately coagulates and drops out of solution. The silica can then be filtered out and dried. This same operation was conducted in the presence of the sulfated bentonite so that both materials (the sulfated bentonite and the Ludox silica) crashed out of solution or suspension together. The dried composite powder, which contained nominally 34 wt. % silica, improved physical morphology, reducing reactor fouling, but also unexpectedly significantly increased the catalytic activity (in some cases, in excess of 100%).

Comparative Examples C1-C8 in Table 3 were performed using the same general procedures, except that the starting support material was a sodium form (Na) of bentonite (National Standard), rather than the acidic/sulfated form. None of these comparative examples exhibited acceptable catalytic activity.

Examples 34-42

Sonication Treatment of Sulfated Bentonite

Table 4 summarizes the effect of sonication treatments on the catalytic activity of catalyst systems containing sulfated bentonite Z130. The polymerization experiments were performed using the same polymerization procedure as in Example 1, except the amount of the metallocene compound was varied, as shown in Table 4. In some experiments, the sulfated bentonite support was first sonicated with a high-powered ultrasound horn (Sonics & Materials Inc. VC-500, 500W) to break up the larger particles prior to heat treatment and polymerization. Typically, 25-50 g of the listed support was slurried in 200-400 mL of deionized water. The ultrasonic horn was inserted about midway into the slurry, which was then simultaneously sonicated and stirred with a magnetic stirrer for the time listed in Table 4. Afterward, the slurry was dropped into about 2 L of isopropanol, causing crash-out of the solids, which were then filtered and dried.

Despite the sonication treatment, the support re-agglomerated during the alcohol drop-out, filtration, and drying. In some treatments, it produced a semi-hard brick which was then ground and pushed through a 35-mesh screen. This resulted in a solid that was in the normal particle size range (10-250 μm). Interestingly, this treatment unexpectedly improved the activity of the catalyst, even though little change to the overall particle size distribution had occurred. While not wishing to be bound by theory, is believed that the treatment of disintegration and re-combination modified the pore structure and the surface area of these supports. Moreover, this probably permitted easier disintegration of the support during later polymerization, resulting in improved catalytic activity.

Figure 4:
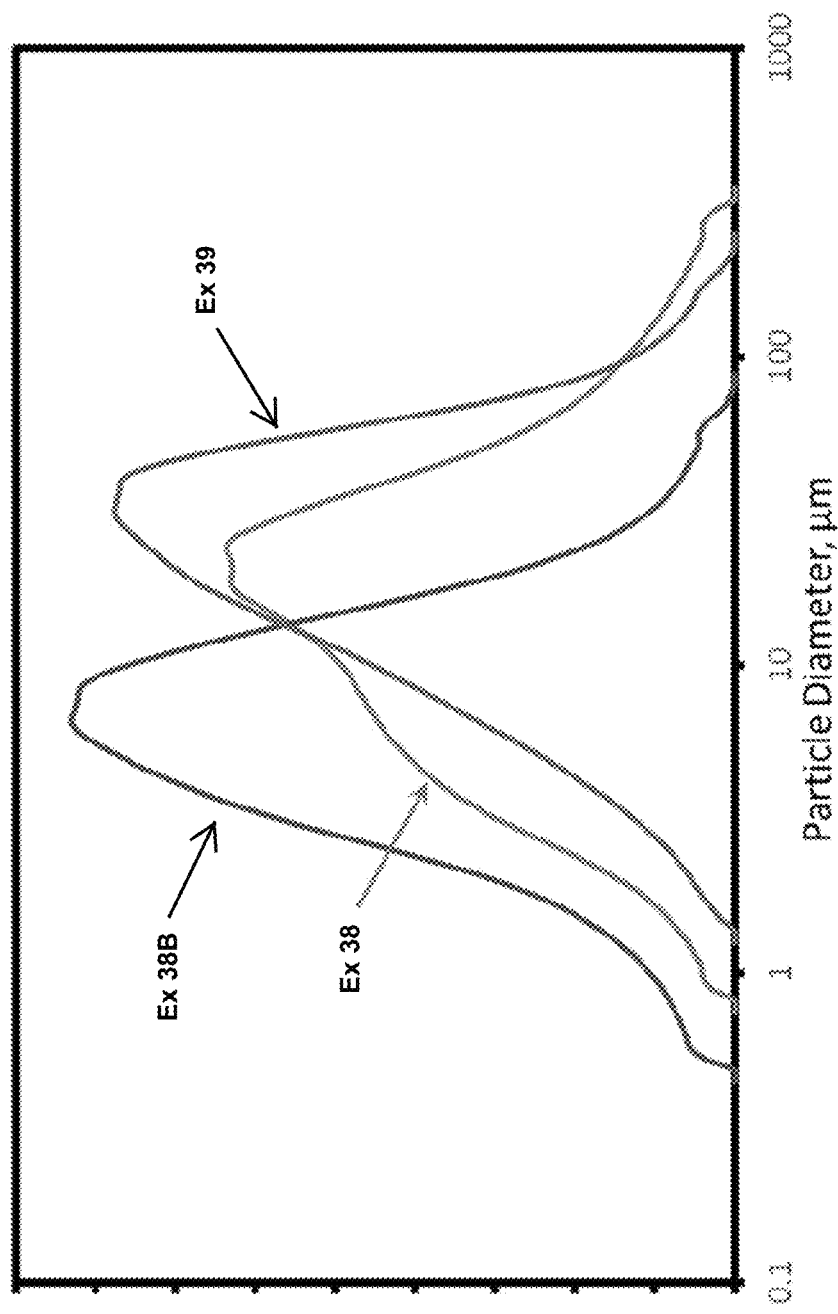
FIG. 4 presents a plot of the particle size distributions of the sulfated bentonite compositions of Example 38, Example 38B, and Example 39.

FIG. 4 illustrates the particle size distribution of Examples 38-39. The initial particle size distribution of Z130 is Example 38. A sample of the Z130 was then added to water, forming a low-viscosity slurry, which was then sonicated for 18 hr. The slurry became thicker with sonication time, requiring the addition of more water to keep the mixture stirring. At the end of the experiment, the volume of the slurry had tripled and the slurry was still so thick that it could barely be stirred on a magnetic hot plate. The sonicated particle size distribution is Example 38B, with a large reduction in overall particle size, likely due to particle breakage. A sample of the thick slurry was added to a large excess of isopropanol, causing re-agglomeration and immediate precipitation of the solids in the slurry. Before contact with alcohol, it was impossible to filter this thick colloidal slurry through standard filter paper. However, after precipitation in isopropanol, it filtered easily and quickly. The particle size distribution of the composition after alcohol re-agglomeration (Example 39), unexpectedly, was much narrower than the original distribution (Example 38), with a reduction in the amount of very large and very small particles. Table 5 summarizes the particle size distribution features from the distribution curves shown in FIG. 4. After the alcohol treatment, the precipitated composition of Example 39 was filtered and dried in a vacuum oven. This soft cake was then pushed through a 35 mesh screen, heat treated at 250° C., and tested for polymerization activity. Surprisingly, the support activity of Example 39 was 50% greater than that of the original support without sonication (Example 38). As shown in Table 5, the sulfated bentonite composition of Example 39 had a d50 average particle size of 22 μm, a d10 particle size of 5.6 μm, a ratio of d90/d10 of 10.4, a ratio of d90/d50 of 2.7, and a span of 2.4.

Activator-support particle size distributions were determined by using an aqueous suspension of the activator-support and a Microtrac S3500 laser particle size analyzer. Conditions were set to "opaque" with a run time of 30 sec, number of measurements 3, and shape spherical. As a skilled artisan would readily recognize, supporting a metallocene compound on the activator-support would not impact the particle size distribution, thus the particle size distribution of the supported catalyst would be effectively the same as the particle size distribution of the activator-support. This is because the tiny amount of metallocene added (e.g., 2-3 wt. %) is almost entirely adsorbed into the internal pores of the support's porous matrix. In addition, the size of these metallocenes, measured in Ang, is insignificant compared to the size of solid support particles, which are measured in microns.

In other variations of this sonication treatment, shown in Table 4, other treatment agents were added during the sonication treatment. For example, Ludox SM-AS (colloidal silica, 44 wt. % of the solid composition) was also added to the sonicated slurry before it was dripped into excess alcohol. Thus, the two components instantly precipitated or coagulated together. This was done in an attempt to use the colloidal silica particles to separate the sonicated bentonite particles, thus preventing their hard re-fusion during drying. This seemed to provide improved morphology, and it also increased the polymerization activity. The other treatments shown in Table 4 also improved the activity. One of those treatments incorporated an aluminum-zirconium colloidal solution (Locron AZL 35G; the colloidal solution contained 5.4 wt. % Al, 5 wt. % Zr, 6.3 wt. % chloride, and 4.2 wt. % % glycine, which results in a Al/Zr molar ratio of 2 to 6 (4.1 for the sample tested) and a metal to chloride molar ratio of 0.9 to 1.5 (1.2 for the sample tested); the solution of colloidal particles has a pH of 3.5 to 4.5 (3.8 for the sample tested)).

The change in structure resulting from the sonication treatments was also evident by a change in porosity. Nitrogen sorption experiments were conducted on Examples 38-42 of Table 4. A summary of the physical characteristics of these sulfated bentonite based compositions is listed in Table 6 for Examples 38-42 (Cat 1-5). Example 38 (Cat 1) was the original Z130 product, Example 39 (Cat 2) was Z130 sonicated for 18 hr and then precipitated in isopropanol, and Examples 40-42 (Cat 3-5) were Z130 sonicated for 18 hr, mixed with colloidal silica, $Bu_4POH$, or colloidal alumina-zirconia, and then precipitated in isopropanol. Each example was then filtered, dried, and heat treated for ~2 hr at 250° C. prior to polymerization experiments.

For activator-support (e.g., sulfated bentonite composition) characterization, about 0.2 g of each sample were degassed in a physisorption tube, using a Micromeritics SmartVacPrep. To prevent portions of the fine particles from boiling up to a region of the sample tube not in the heated zone, the pressure was reduced gradually, and the temperature was increased stepwise. The pressure was initially reduced from ambient to 5 mm Hg, at a controlled rate of 5 mm Hg/s, while holding the samples at 30° C. After reaching sufficient vacuum (~0.09 mm Hg), the temperature was increased to 50° C., then to 70° C., then to 90° C., with each temperature step held for 30 minutes. The last step held the temperature at 300° C. for 12 hours, with the final vacuum reaching a pressure of about 1 milliTorr. After cooling to ambient, the samples were backfilled with nitrogen and analyzed on a Micromeritics TriStar II nitrogen physisorption instrument. Approximately 64 adsorption points were collected to construct an isotherm, and software packages included with the instrument were used to determine surface areas, total pore volumes, and to generate pore size distribution curves. Surface areas were determined using the BET method (Brunauer, *J. Am Chem. Soc.,* 1938, 60, 309), from adsorption isotherm points having P/Po values from 0.0 to 0.2. Pore volume values were calculated from the isotherm point having a P/Po value closest to 0.982. Pore size and pore volume distributions were obtained from DFT calculations (see Colloids and Surfaces A: Physicochemical and Engineering Aspects, Volume 437, 20 Nov. 2013, Pages 3-32), with thickness curves generated using the Halsey equation (*J. Chem. Phys.,* 1948, 16, 931). The absolute pore volumes and surface area data determined as a function of pore size were normalized to equal the overall total pore volume and overall BET surface area, which were determined by nitrogen sorption.

Figure 5:
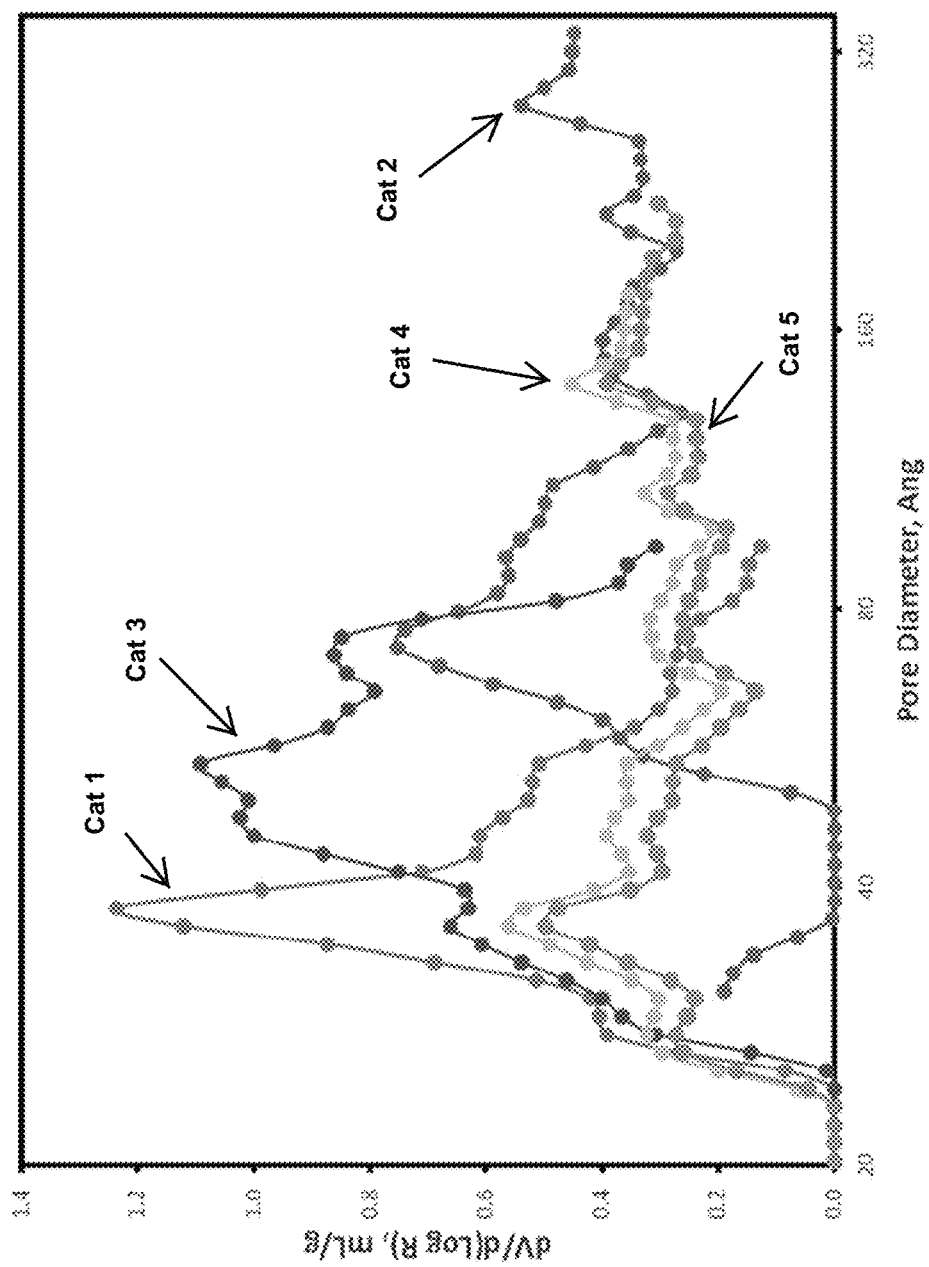
FIG. 5 presents a plot of the pore volume distributions as a function of pore diameter (Ang, Angstroms) for the sulfated bentonite compositions of Examples 38-42 (Cat 1-5).
Figure 6:
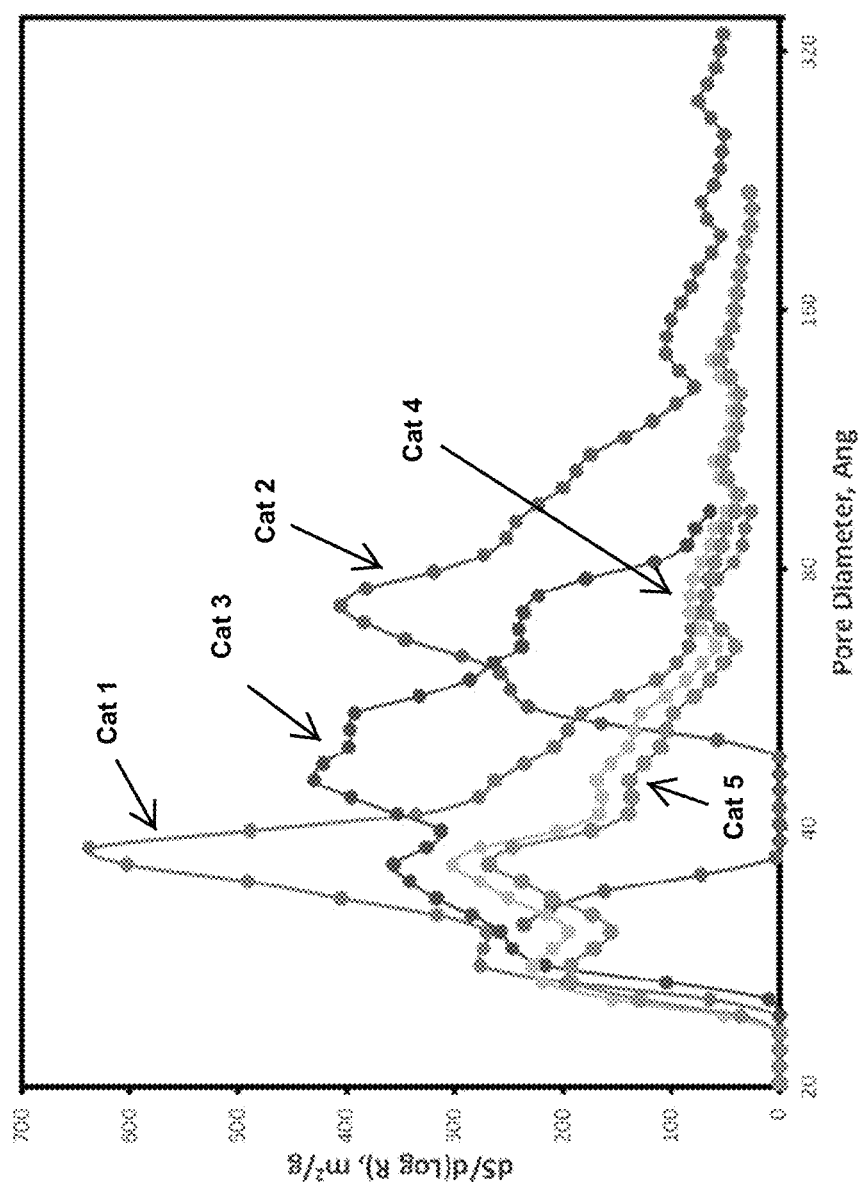
FIG. 6 present a plot of the surface area distributions as a function of pore diameter (Ang, Angstroms) for the sulfated bentonite compositions of Examples 38-42 (Cat 1-5).

Table 6 summarizes certain porosity and surface area features for Examples 38-42 (Cat 1-5), while FIG. 5 is a plot of the pore volume distributions as a function of pore diameter (Ang, Angstroms) for Examples 38-42 (Cat 1-5) using the DFT method, and FIG. 6 is a plot of the surface area distributions as a function of pore diameter (Ang, Angstroms) for Examples 38-42 (Cat 1-5) using the DFT method. At generally constant total BET surface area, the inventive examples all had a higher total pore volume and larger pores (e.g., higher average pore diameter) as compared to the control example. It is believed that the increased pore volume and pore size distribution due to the sonication treatment is one reason why the catalytic activity was improved. Further, more of the surface area of each inventive example was present in larger pores, which also results in higher catalytic activity during polymerization.

Table 7 quantifies how the pore volume (upper half of table) and surface area (lower half of table) are distributed between small and large pores (DFT calculation). Each entry shows the percentage of pore volume or surface area that is in pores as large or larger than the diameter indicated. Unexpectedly, for each inventive example, the sonication treatment enlarged the pores, and placed more pore volume and surface area into those pores, where they are more effective for polymerization.

Likewise, Table 8 quantifies how the pore volume (upper half of table) and surface area (lower half of table) are distributed between small and large pores (DFT calculation). However, Table 8 lists the actual volumes and areas in absolute terms, whereas Table 7 lists the volumes and areas in relative terms (percentages). As with Table 7, Table 8 demonstrates that sonication enlarged the pores. Generally, the sulfated bentonite compositions of Examples 39-42 had total pore volumes of 0.5-0.62 mL/g, total BET surface areas of 250-340 $m^2/g$, average pore diameters of 60-80 Ang, 30-81% of the total pore volume in pores with diameters of greater than or equal to 60 Mg, 0.1-0.35 mL/g of pore volume in pores with diameters of greater than or equal to 60 Ang, 10-50% of the total BET surface area in pores with diameters of greater than or equal to 60 Ang, and 20-120 $m^2/g$ of surface area in pores with diameters of greater than or equal to 60 Ang.

Examples 43-45

Air Classification of Sulfated Bentonite

Figure 7:
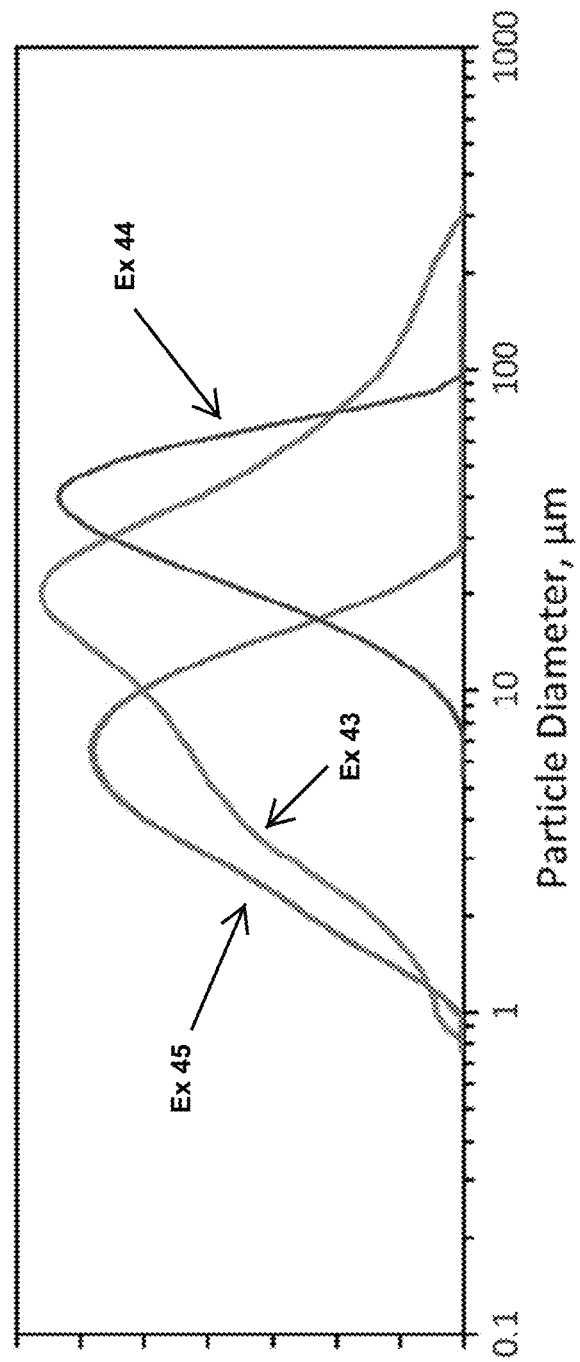
FIG. 7 presents a plot of the particle size distributions of the sulfated bentonite compositions of Examples 43-45.

FIG. 7 and Table 9 illustrate the particle size distributions of Examples 43-45, using the same technique as Examples 38-39. The initial Z130 support (Example 43) was air classified to remove the largest and smallest particles from the distribution, and Example 45 is the fine part of the initial Z130 product that was removed by air classification. Example 44 is the air classified sample, in which both large particles (nominally those larger than 100 μm) and small particles (nominally those smaller than 10 μm) were removed. These very large and very small particles often cause problems within polymerization reactor systems. In Table 9, the sulfated bentonite composition of Example 44 had a d50 average particle size of 38 μm, a d10 particle size of 18 μm, a ratio of d90/d10 of 4, a ratio of d90/d50 of 1.9, and a span of 1.4.

Polymerization experiments were performed using Examples 44-45 and the same polymerization procedure as in Example 1, at a constant amount of the metallocene compound, as shown in Table 10. The activity is a little better for the fine material (Example 45), however, this sample caused unacceptable fouling during polymerization. The walls of the reactor became coated with a polymer skin and large chunks of polymer were formed. Most of the polymer particles were smaller than 200 μm. The polymerization runs of Example 44 were problem free, and most of the polymer particles were in the 100-1000 μm range.

Examples 46-79

Polymer Properties

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of 200 µL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta*(\omega)| = \frac{\eta_0}{[1 + (\tau_\eta\omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η)) ("relaxation time");
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

The long chain branches (LCBs) per 1,000,000 total carbon atoms of the overall polymer were calculated using the method of Janzen and Colby (*J. Mol. Struct.*, 485/486, 569-584 (1999), from values of zero shear viscosity ($\eta_0$) determined from the Carreau-Yasuda model described hereinabove, and values of Mw obtained using the GPC procedure described hereinabove.

Table 11 summarizes the properties (e.g., molecular weight, rheology, LCB content) of ethylene homopolymers produced from polymerization experiments performed similarly to Example 1. MI and HLMI in Table 11 were determined using the CY rheological model. The activator-supports were as follows: Examples 46-49 (Z124), Examples 50-52 (Z124 modified with 34% Ludox), Examples 53-54 (Z120 microwave treated for 1 min), Examples 55-57 and 73-79 (fluorided silica-alumina, 7 wt. % F), Examples 58 and 61 (Z130 treated with 0.5 mmol NBu$_4$Cl/g), Examples 59 and 62 (Z130 treated with 0.5 mmol adamantyl amine/g), Examples 60 and 63 (Z130 treated with 0.5 mmol PBu$_4$OH/g), Examples 64 and 67 (Z120, Z130, or Z160, pre-treated with DEZ, as described in Table 2), Examples 65-66 (Z120 or Z130 pre-treated with TIBA, as described in Table 2), Example 68 (Z130), Examples 69-71 (Z130 sonicated), and Example 72 and others (Z130 treated with aqueous Zn(NO$_3$)$_2$ or other water-soluble compounds, as indicated in Table 3).

Generally, polymers made using sulfated bentonite supports had less LCB content, averaging approximately 0.40 LCBs per million total carbon atoms, whereas using fluorided silica-alumina resulted in polymers averaging approximately 0.58 LCBs per million total carbon atoms.

The Carreau-Yasuda "a" parameter (CY-a parameter) is particularly sensitive to small changes in LCB. From Table 11, the CY-a values of polymers produced using sulfated bentonites are higher than that from fluorided silica-alumina (0.50 versus 0.44). The higher CY-a indicates lower LCB content, and this difference is significant and unexpected. For example, a polymer with a slightly higher CY-a can translate into a blown film with higher MD tear resistance. Also as a general trend in Table 11, the polymers produced using sulfated bentonite supports produced higher molecular weights (Mn, Mw and Mz), even though there was no significant change in molecular weight distribution (Mw/Mn or Mz/Mw).

Figure 8:
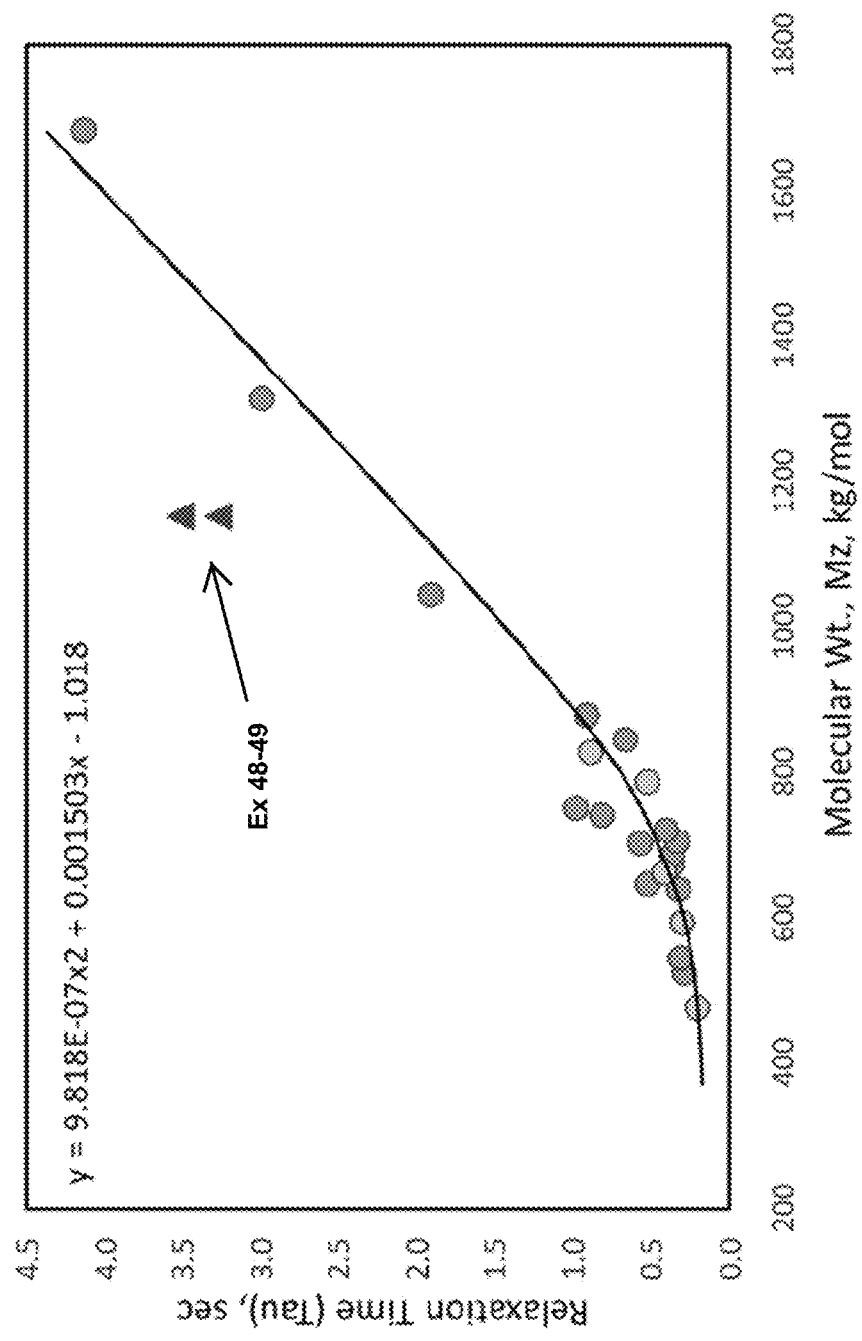
FIG. 8 presents a plot of the relaxation time (sec) versus the z-average molecular weight (kg/mol) for the polymers of Examples 48-49 and comparative polymers.
Figure 9:
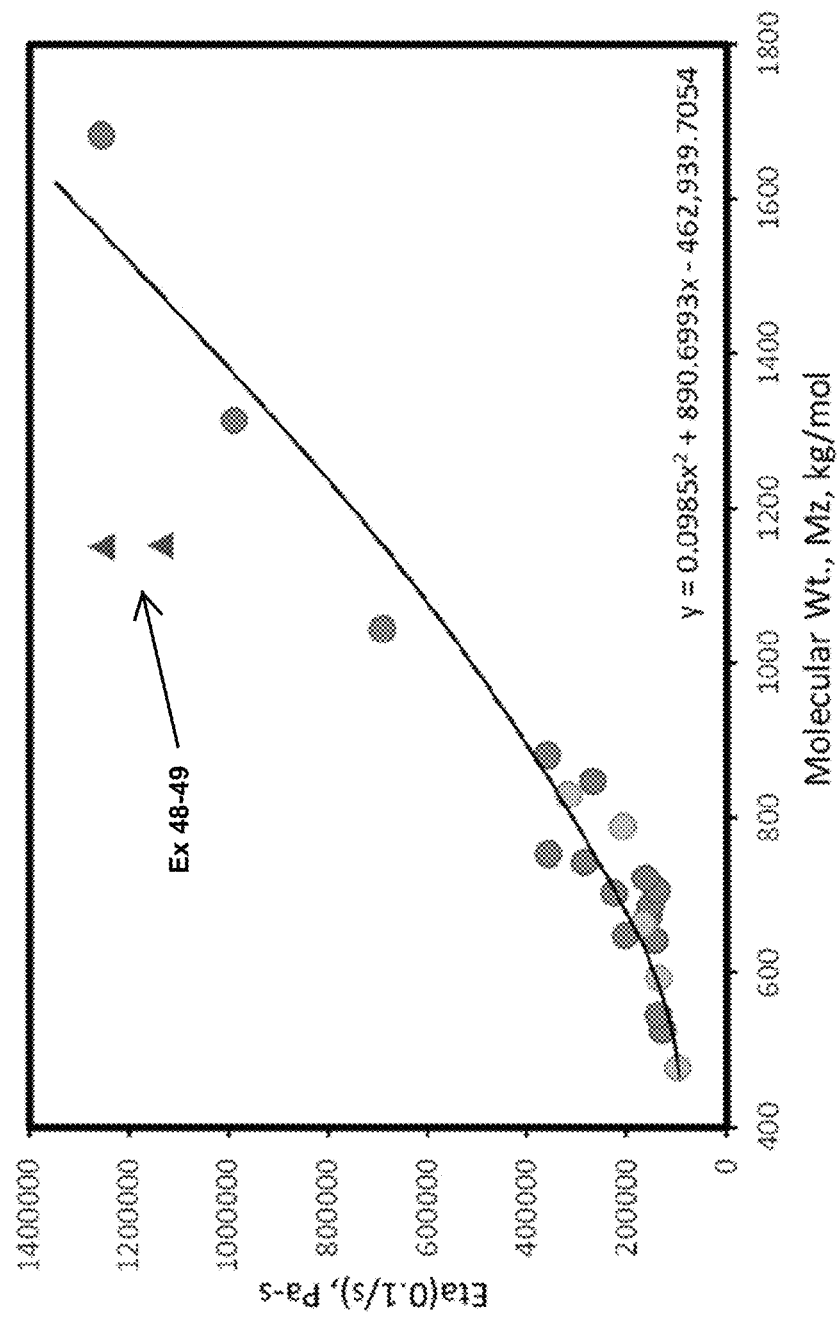
FIG. 9 presents a plot of the measured viscosity at 0.1 sec$^{-1}$ (Pa-sec) versus the z-average molecular weight (kg/mol) for the polymers of Examples 48-49 and comparative polymers.

The Z124 sulfated bentonite produced polymers (Examples 48-49) that differed the most in rheological properties (at a given molecular weight) from the other activator-supports and examples in Table 11. FIG. 8 is a plot of the relaxation time (sec) versus the z-average molecular weight (kg/mol) for the polymers of Examples 48-49 (using Z-124) compared to other examples in Table 11, while FIG. 9 is a plot of the measured viscosity at 0.1 sec$^{-1}$ (Pa-sec) versus the z-average molecular weight (kg/mol) for the polymers of Examples 48-49 (using Z-124) compared to other examples in Table 11. In addition to having very high CY-a values, Examples 48-49 also had much higher relaxation times than would be expected based on their molecular weight (Mz): the relaxation time as a function of Mz was greater than $9.818 \times 10^{-7}(Mz)^2 + 0.001503(Mz) - 1.018$ as shown in FIG. 8, and further, the relaxation times for Examples 48-49 also were greater than $9.818 \times 10^{-7}(Mz)^2 + 0.001503(Mz) - 0.5$, wherein Mz is in kg/mol and the relaxation time is in sec. Likewise, Examples 48-49 had much higher measured melt viscosities at low shear (0.1 sec$^{-1}$) than would be expected based on their molecular weight (Mz): the viscosity at 0.1 sec$^{-1}$ as a function of Mz was greater than $0.0985(Mz)^2 + 890.7(Mz) - 462,939$ as shown in FIG. 9, and further, the viscosities at 0.1 sec$^{-1}$ for Examples 48-49 also were greater than $0.0985(Mz)^2 + 890.7(Mz) - 300,000$, wherein Mz is in kg/mol and the viscosity is in Pa-sec.

Figure 10:
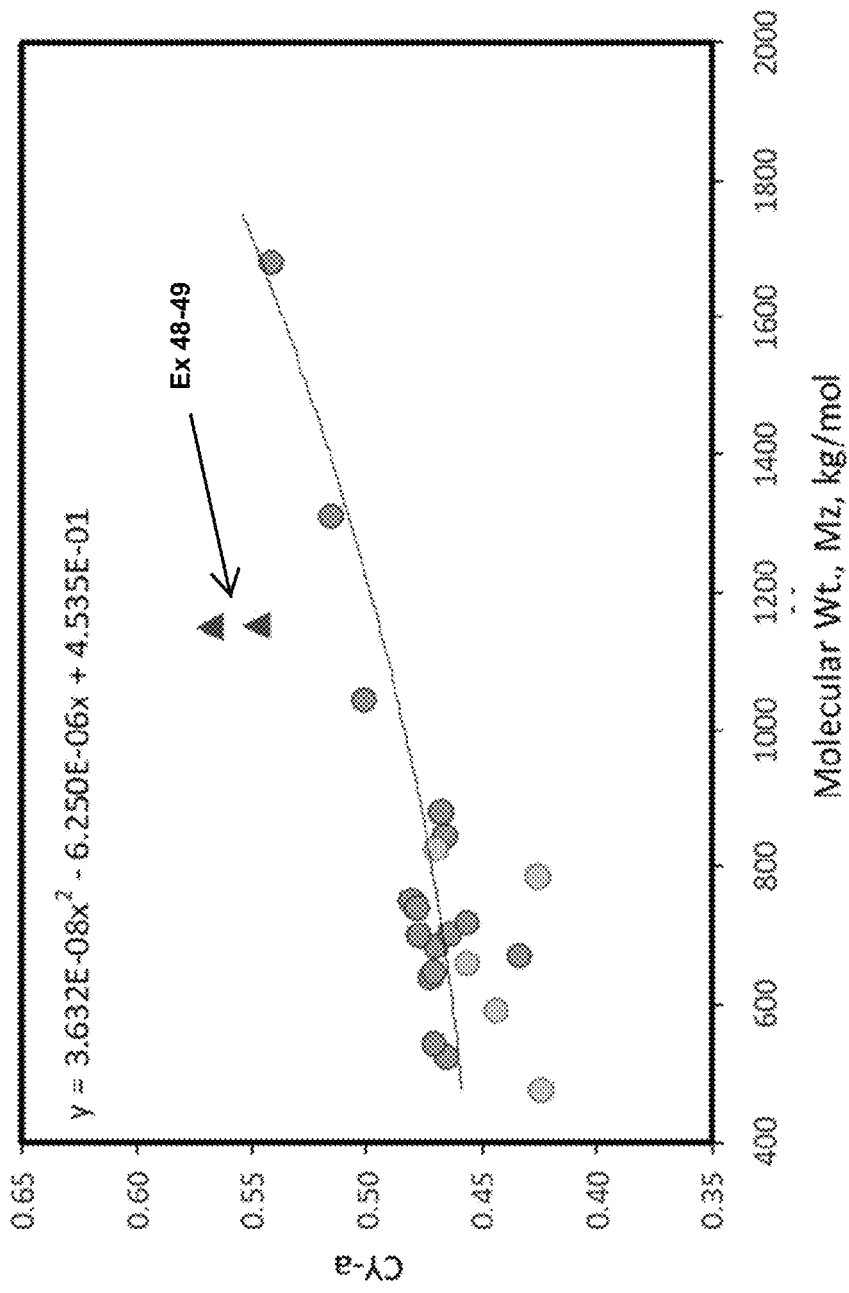
FIG. 10 presents a plot of the CY-a parameter versus the z-average molecular weight (kg/mol) for the polymers of Examples 48-49 and comparative polymers.
Figure 11:
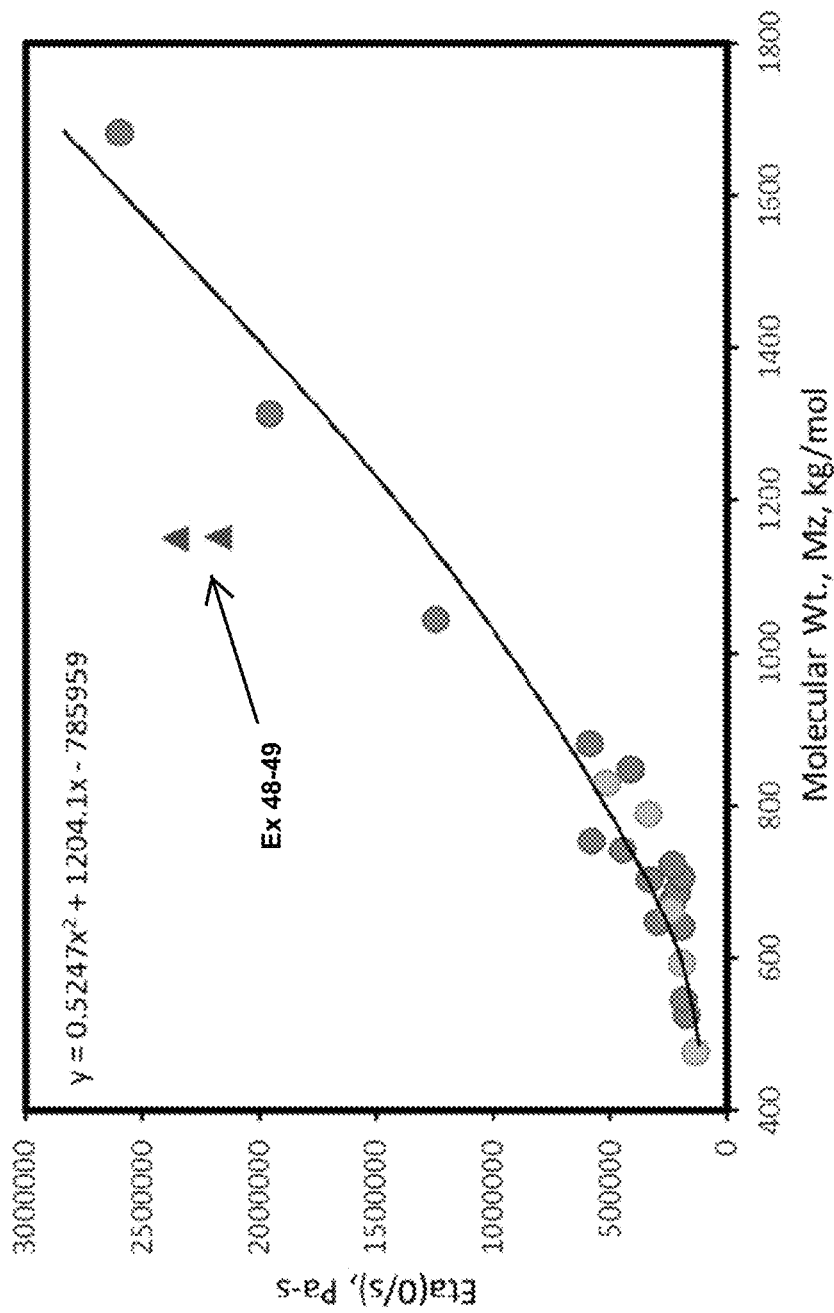
FIG. 11 presents a plot of the zero-shear viscosity (Pa-sec) versus the z-average molecular weight (kg/mol) for the polymers of Examples 48-49 and comparative polymers.
Figure 12:
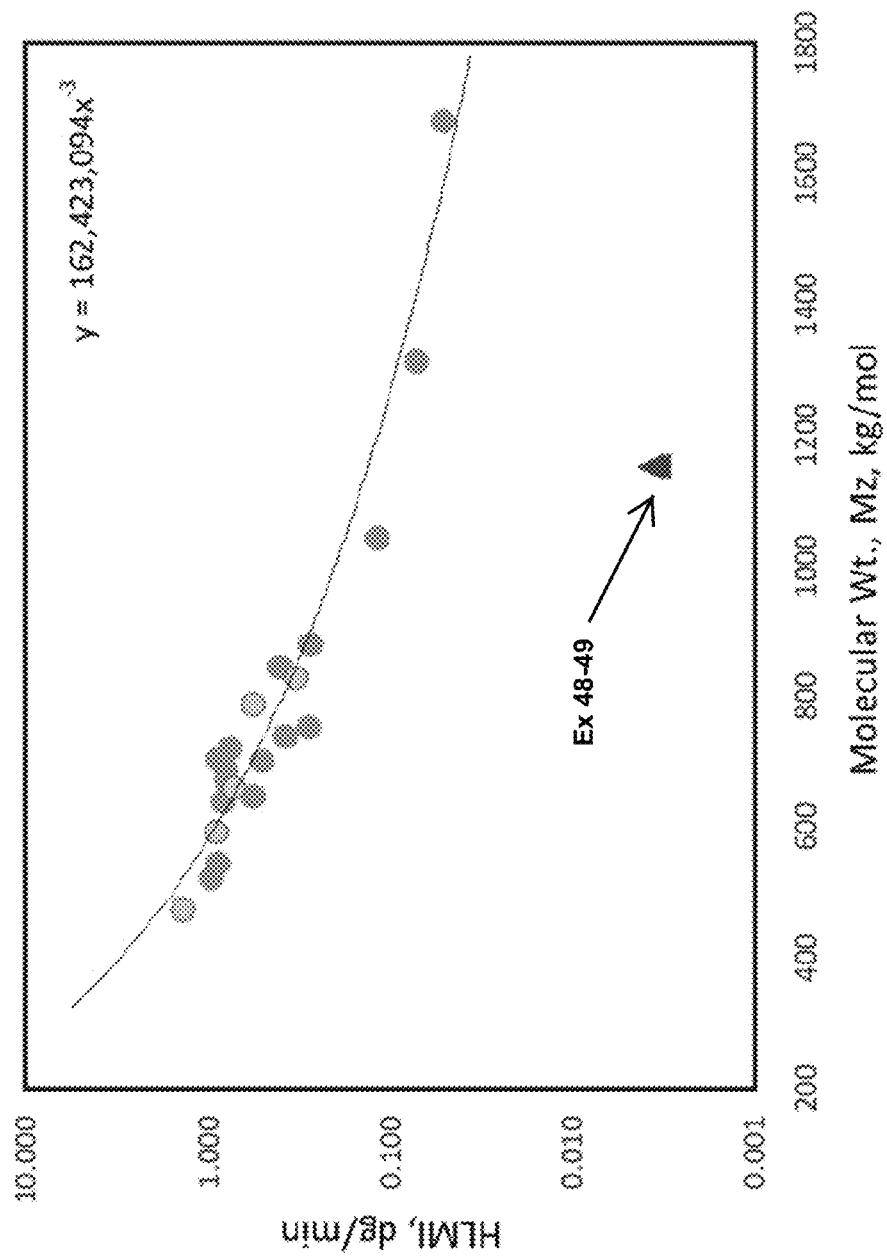
FIG. 12 presents a plot of the HLMI (g/10 min) versus the z-average molecular weight (kg/mol) for the polymers of Examples 48-49 and comparative polymers.

Similarly, FIGS. 10-12 are plots of the CY-a parameter, the zero-shear viscosity, and the HLMI, respectively, versus the z-average molecular weight (kg/mol) for the polymers of Examples 48-49 and comparative polymers from Table 11. Examples 48-49 also had much higher CY-a parameters and zero-shear viscosities, and much lower HLMI values, than would be expected based on their molecular weight (Mz). For instance, the HLMI values (via the CY model) for Examples 48-49 were less than $162,423,094(Mz)^{-3}$ as shown in FIG. 12, and further, the HLMI values also were less than $0.8*(162,423,094(Mz)^{-3})$ and less than $0.7*(162,423,094(Mz)^{-3})$, wherein Mz is in kg/mol and the HLMI is in g/10 min.

Examples 80-85

Heat Treatment and Metal Alkyl Pre-Treatment of Sulfated Bentonite

Further investigation based on Examples 6-19 and Table 2 was performed to determine the combined effects of heat treatment temperature and metal alkyl pre-treatment on properties of polymers produced from catalyst systems containing sulfated bentonite grade Z130. Surprisingly, as summarized in Table 12, for both DEZ and TIBA pre-treatment of the sulfated bentonite support, much higher polymer CY-a values and relaxation times were achieved when lower heat treatment temperatures were used, that is, less than 100° C.

Examples 86-88

Hydrothermal Treatment of Sulfated Bentonite

Table 13 summarizes the effect of hydrothermal treatment on the catalytic activity of catalyst systems containing sulfated bentonite Z130. The polymerization experiments were performed using the same polymerization procedure as in Example 1. The control experiment was Example 87.

Alkaline hydrothermal treatments have sometimes been used to enlarge the pores of silica, although they are not usually known to work with alumina or other supports. In Example 88, 30 g of Z130 were slurried in 300 mL of water, and 20 mL of ammonium hydroxide (28% $NH_3$) was added with stirring to a pH of 11. The slurry immediately thickened, making it difficult to stir. Therefore, more water was added, raising it to a total of 500 mL. Heat was applied and before the temperature could reach 60° C. the slurry thickened again, and still more water had to be added. Then, the heat was applied again to 80° C., causing the slurry to thicken again. Finally, the experiment was terminated by adding 2 L of additional water, and an attempt was made to recover the product by vacuum filtration. However, the filtration failed. Even after two days, only a few mL of water went through the filter. Therefore, the experiment was abandoned.

In Example 86, however, 30 g of Z130 were slurried in 300 mL of water, and the pH was adjusted to below 1 by the addition of 2 mL of concentrated hydrochloric acid. No significant thickening was observed. The temperature was raised to 80-90° C. and the mixture was allowed to stir for 7 days. Afterward, it was filtered easily and dried in a vacuum oven at 100° C. to recover the sulfated bentonite composition. Surprisingly, subsequent ethylene polymerization with Example 86 revealed a 60% increase in support activity over control Example 87.

Examples 89-96

Dual Metallocene Catalyst Systems with Sulfated Bentonite

Table 14 summarizes ethylene/1-hexene copolymerization using a dual catalyst system containing fluorided silica-alumina (Examples 89-90), Z130 with zinc addition (Examples 91-92), Z130 with fines removed (Examples 93-94, Z130FR, in which Z130 was slurried in water, allowed to settle for one minute, and the unsettled part was poured off to remove fines), and Z120 sulfated bentonite (Examples 95-96). The polymerization runs were performed similarly to that shown in Table 4, except that 0.8 mg of the metallocene was replaced with 2.7 mg total metallocene at 1:1 molar ratio of MET 1:MET 2. In Table 14, ho (10 kg weight) and high load melt index (HLMI, 21.6 kg weight) were determined in accordance with ASTM D1238 at 190° C. (g/10 min).

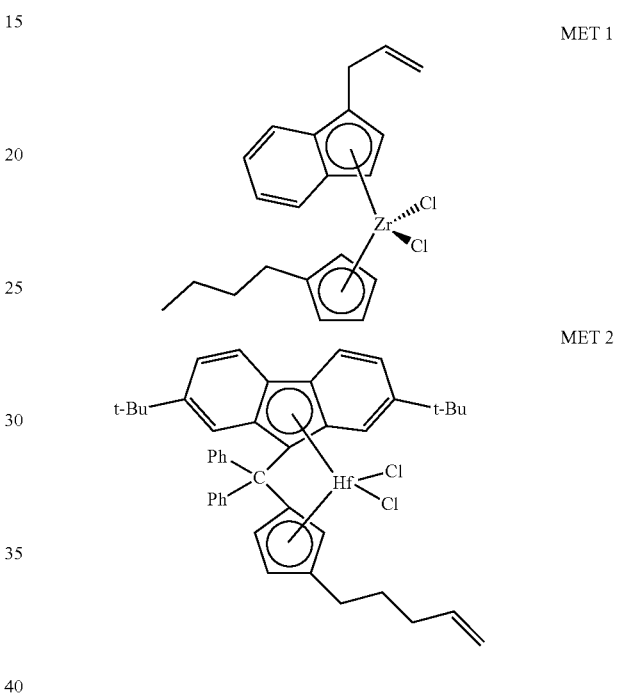

Polymerization conditions were 95° C., 420 psig (2.9 MPa), 300 mg activator-support, 3 g 1-hexene, and 100 ppm Hz. Pre-contacting in Table 14 indicates that all components were added with a small amount of isobutane, and stirred for 10 min before starting the polymerization run. The dual catalyst systems containing the sulfated bentonite supports produced polymers with similar properties and similar catalyst activities to that of fluorided silica-alumina.

TABLE A

| Example | Support Type | Bentonite Type | Sulfur wt. % | Sodium wt. % | Calcium wt. % | Silicon wt. % | Heat Treatment | Metallocene mg | Support Activity kg/g/h | Met Activity g/mg/h |
|---|---|---|---|---|---|---|---|---|---|---|
| A | Z120 | H | 3.62 | 0.12 | 4.38 | 28.3 | 380° C. | 3 | 12.04 | 228 |
| B | Z120 | H | 3.62 | 0.12 | 4.38 | 28.3 | 380° C. | 3 | 8.71 | 172 |
| C | Z120 | H | 3.62 | 0.12 | 4.38 | 28.3 | 280° C. | 1 | 6.09 | 348 |
| D | Z124 | H | 3.03 | 0.13 | 3.99 | 28.7 | 25° C. | 1 | 0.54 | 54 |
| E | Z124 | H | 3.03 | 0.13 | 3.99 | 28.7 | 300° C. | 2 | 1.02 | 51 |
| F | Z124 | H | 3.03 | 0.13 | 3.99 | 28.7 | 300° C. | 5 | 1.30 | 26 |
| G | Z160 | H | 4.64 | 0.10 | 5.55 | 28.7 | 280° C. | 2 | 7.59 | 375 |
| H | CC 105SF | H | 2.54 | 0.10 | 2.93 | 30.9 | 280° C. | 2 | 3.50 | 175 |
| I | CC 115FF | H | 2.85 | 0.18 | 2.93 | 31.6 | 280° C. | 2 | 4.12 | 206 |
| J | F3 | Ca | 0.16 | 0.21 | 3.36 | 29.0 | 380° C. | 3 | 0.78 | 307 |
| K | F3 | Ca | 0.16 | 0.21 | 3.36 | 29.0 | 380° C. | 3 | 1.17 | 40 |
| L | F100 | H/Ca | 0.15 | 0.10 | 4.59 | 28.4 | 380° C. | 3 | 2.01 | 107 |
| M | WB Hydrogel | Ca | 0.21 | 1.45 | 1.99 | 32.6 | 300° C. | 2 | 1.34 | 67 |

TABLE A-continued

| Example | Support Type | Bentonite Type | Sulfur wt. % | Sodium wt. % | Calcium wt. % | Silicon wt. % | Heat Treatment | Metallocene mg | Support Activity kg/g/h | Met Activity g/mg/h |
|---|---|---|---|---|---|---|---|---|---|---|
| N | Bighorn 200 | Ca | 0.28 | 1.57 | 1.72 | 31.9 | 300° C. | 2 | 1.06 | 53 |
| O | TC high PV, neut | Ca | 0.14 | 2.33 | 1.50 | 33.8 | 280° C. | 0.8 | 0.33 | 63 |
| P | FS std | Ca | 0.21 | 1.79 | 5.21 | 30.7 | 280° C. | 0.8 | 0.15 | 29 |
| Q | Bentonite Na | Na | 0.25 | 2.29 | 3.21 | 27.2 | 280° C. | 0.8 | 0.51 | 95 |
| R | Bentonite MPBio | H/Na | 0.22 | 1.61 | 1.01 | 30.5 | 280° C. | 0.8 | 1.61 | 301 |
| S | Bentonite MPBio | H/Ca | — | — | — | — | 280° C. | 0.8 | 1.69 | 317 |
| T | K10 | Na | 0.02 | 0.11 | 0.22 | 36.2 | 280° C. | 0.8 | 0.69 | 129 |
| U | H10 | Na | — | — | — | — | 280° C. | 0.8 | 0.83 | 155 |
| V | Mont Nat | Ca | 0.20 | 1.44 | 1.25 | 31.1 | 280° C. | 0.8 | 0.62 | 117 |

TABLE 1

| Example | Treatment | Heat Time | Support Activity kg/g/h | Met Activity g/mg/h |
|---|---|---|---|---|
| 2 | Vacuum oven 100° C. | 12 h | 2.09 | 198 |
| 3 | Microwave oven | 1 min | 3.14 | 157 |
| 4 | Microwave oven | 1.5 min | 3.80 | 190 |

TABLE 2

| Example | Support Type | Heat Treatment | Heat Time | Other Treatment | Other Treatment Time | Metallocene mg | Support Activity kg/g/h | Met Activity g/mg/h |
|---|---|---|---|---|---|---|---|---|
| 6 | Z120 | 25° C. | na | none | — | 3 | 1.58 | 131 |
| 7 | Z120 | 25° C. | na | 0.16 mmol DEZ/g, 40 min | 5 min | 3 | 3.86 | 45 |
| 8 | Z120 | 25° C. | na | 0.3 mmol TIBA/g, 24 hr | 5 min | 0.8 | 1.08 | 147 |
| 9 | Z120 | 100° C. | 12 h | none | — | 1 | 2.09 | 297 |
| 10 | Z120 | 100° C. | 12 h | 1 mL of 1M DEZ in reactor | 24 h | 1 | 3.39 | 222 |
| 11 | Z160 | 280° C. | 3 h | none | — | 1 | 7.14 | 525 |
| 12 | Z160 | 280° C. | 3 h | 1 mL of 1M DEZ in reactor | 5 min | 1 | 13.30 | 548 |
| 13 | Z130 | 250° C. | 2 h | none | — | 0.8 | 4.58 | 859 |
| 14 | Z130 | 250° C. | 2 h | 0.3 mmol DEZ/g, 24 hr | 24 h | 0.8 | 5.07 | 762 |
| 15 | Z130 | 250° C. | 2 h | 0.5 mmol TIBA/g, 24 hr | 24 h | 0.8 | 9.39 | 1261 |
| 16 | Z130 | 250° C. | 2 h | 0.5 mmol TIBA/g, 24 hr | 24 h | 0.8 | 7.29 | 979 |
| 17 | Z130 | 100° C. | 48 h | none | — | 1 | 2.19 | 306 |
| 18 | Z130 | 100° C. | 48 h | 0.3 mmol DEZ/g, 24 hr | 18 h | 0.8 | 7.58 | 1140 |
| 19 | Z130 | 100° C. | 48 h | 0.5 mmol TIBA/g, 24 hr | 18 h | 0.8 | 6.41 | 860 |

TABLE 3

| Example | Support Type | Heat Treatment | Heat Time | Aqueous Treatment | Amount | Metallocene mg | Support Activity kg/g/h | Met Activity g/mg/h |
|---|---|---|---|---|---|---|---|---|
| 20 | Z130 | 280° C. | 7 h | none | — | 0.8 | 4.58 | 859 |
| 21 | Z130 | 280° C. | 7 h | Zn(NO$_3$)$_2$ | 3 mmol/g | 1.0 | 10.10 | 240 |
| 22 | Z130 | 250° C. | 2 h | Zn(NO$_3$)$_2$ | 3 mmol/g | 0.8 | 4.99 | 856 |
| 23 | Z130 | 280° C. | 7 h | Al(NO$_3$)$_3$ + NaOH | 3&3 mmol/g | 1.0 | 3.26 | 85 |
| 24 | Z130 | 250° C. | 2 h | AlOCl$_2$ | 15 mmol/g | 0.8 | 0.18 | 13 |
| 25 | Z130 | 250° C. | 2 h | PBu$_4$OH | 0.5 mmol/g | 0.8 | 6.54 | 654 |
| 26 | Z130 | 250° C. | 2 h | PBu$_4$OH | 0.5 mmol/g | 0.8 | 6.58 | 987 |
| 27 | Z130 | 250° C. | 2 h | adamantyl amine | 0.5 mmol/g | 0.8 | 6.35 | 286 |
| 28 | Z130 | 250° C. | 2.5 h | H$_2$SO$_4$ | 1.8 mmol/g | 0.8 | 1.78 | 114 |
| 29 | Z124 | 25° C. | — | None | — | 1.0 | 0.54 | 54 |
| 30 | Z124 | 25° C. | — | Colloidal SiO$_2$, IPA | 34% | 1.0 | 0.81 | 54 |
| 31 | Z124 | 300° C. | 18 h | none | — | 0.8 | 1.30 | 130 |
| 32 | Z124 | 300° C. | 18 h | Colloidal SiO$_2$, IPA | 34% | 0.8 | 4.57 | 306 |
| 33 | Z124 | 300° C. | 18 h | Colloidal SiO$_2$, IPA | 34% | 0.8 | 5.43 | 364 |
| C1 | Na | 250° C. | 18 h | Bu$_4$NCl, 150 mL | 0.5 mmol/g | 0.8 | 0.21 | 36 |
| C2 | Na | 250° C. | 18 h | Bu$_4$NCl, 1.5 L | 0.5 mmol/g | 0.8 | 0.21 | 35 |
| C3 | Na | 250° C. | 18 h | H$_2$O, then excess IPA | — | 0.8 | 0.09 | 17 |
| C4 | Na | 250° C. | 18 h | AlOCl$_2$ | 3 mmol/g | 0.8 | 0.13 | 17 |
| C5 | Na | 250° C. | 18 h | none | — | 0.8 | 0.05 | 9 |
| C6 | Na | 250° C. | 18 h | PBu$_4$OH | 1 mmol/g | 0.8 | 0.04 | 7 |

TABLE 3-continued

| Example | Support Type | Heat Treatment | Heat Time | Aqueous Treatment | Amount | Metallocene mg | Support Activity kg/g/h | Met Activity g/mg/h |
|---|---|---|---|---|---|---|---|---|
| C7 | Na | 250° C. | 18 h | Zn(NO$_3$)$_2$ | 2 mmol/g | 0.8 | 0.04 | 8 |
| C8 | Na | 250° C. | 18 h | none | — | 0.8 | 0.37 | 70 |

TABLE 4

| Example | Support Type | Heat Treatment | Heat Time | Other Treatment | Metallocene mg | Support Activity kg/g/h | Met Activity g/mg/h |
|---|---|---|---|---|---|---|---|
| 34 | Z130 | 250° C. | 4 h | none | 0.8 | 4.58 | 859 |
| 35 | Z130 | 250° C. | 4 h | Sonicate 1 h, IPA | 0.8 | 6.40 | 1200 |
| 36 | Z130 | 250° C. | 4 h | Sonicate 1 h, IPA | 0.4 | 8.75 | 1641 |
| 37 | Z130 | 250° C. | 4 h | Sonicate 1 h, IPA | 1.5 | 9.06 | 453 |
| 38 | Z130 | 250° C. | 2 h | none | 0.8 | 3.32 | 623 |
| 39 | Z130 | 250° C. | 2 h | Sonicate 18 h, IPA | 0.8 | 5.01 | 939 |
| 40 | Z130 | 250° C. | 2 h | Sonicate 18 h, 44% Colloidal SiO$_2$, IPA | 0.8 | 5.17 | 543 |
| 41 | Z130 | 250° C. | 2 h | Sonicate 18 h, in 0.9 mmol PBu$_4$OH/g, IPA | 0.8 | 6.42 | 1283 |
| 42 | Z130 | 250° C. | 2 h | Sonicate 18 h, 19% Zr—Al colloidal, IPA | 0.8 | 5.07 | 678 |

TABLE 5

| Example | Initial 38 | Sonicated 38B | Alcohol 39 |
|---|---|---|---|
| Mv, mean, μm | 26.14 | 8.27 | 28.6 |
| Mn, number avg, μm | 1.493 | 1.054 | 3.21 |
| MA, area mean, μm | 6.86 | 3.96 | 12.85 |
| CS, surface area | 0.874 | 1.514 | 0.467 |
| Std Dev, μm | 18.00 | 5.35 | 20.23 |
| Mz, graphic mean | 18.94 | 7.26 | 25.92 |
| σ1, graphic std. dev. | 23.54 | 5.91 | 20.89 |
| Ski, skewness | 0.627 | 0.450 | 0.394 |
| Kg, peakedness | 1.741 | 1.254 | 1.051 |
| D10, μm | 2.86 | 1.910 | 5.62 |
| D20, μm | 4.55 | 2.896 | 9.10 |
| D30, μm | 6.64 | 3.83 | 12.89 |
| D40, μm | 9.41 | 4.86 | 17.09 |
| D50, μm | 13.11 | 6.03 | 21.92 |
| D60, μm | 17.77 | 7.44 | 27.65 |
| D70, μm | 24.0 | 9.21 | 34.58 |
| D80, μm | 33.61 | 11.76 | 43.48 |
| D90, μm | 56.96 | 16.59 | 58.22 |
| D95, μm | 97.95 | 22.64 | 75.00 |
| D90/D10 | 19.94 | 8.69 | 10.36 |
| D90/D50 | 4.34 | 2.75 | 2.65 |
| Span | 4.13 | 2.43 | 2.40 |

TABLE 6

| Example Type | 38 (Cat 1) Control | 39 (Cat 2) Inventive | 40 (Cat 3) Inventive | 41 (Cat 4) Inventive | 42 (Cat 5) Inventive |
|---|---|---|---|---|---|
| Surface Area, m$^2$/g | 318 | 312 | 337 | 260 | 319 |
| Pore Vol. mL/g | 0.406 | 0.616 | 0.527 | 0.504 | 0.538 |
| Peaks at, Ang | 38 | 73 & 280 | 38 & 54 | 38 & 140 | 38 & 140 |
| Avg. Pore Diam., Ang | 51 | 79 | 63 | 78 | 67 |

TABLE 7

| Example Type | 38 (Cat 1) Control | 39 (Cat 2) Inventive | 40 (Cat 3) Inventive | 41 (Cat 4) Inventive | 42 (Cat 5) Inventive |
|---|---|---|---|---|---|
| Percent of pore volume in pores greater than or equal to: | | | | | |
| 40 Ang | 44% | 87% | 69% | 62% | 56% |
| 50 Ang | 25% | 87% | 49% | 51% | 48% |
| 60 Ang | 14% | 81% | 30% | 43% | 42% |
| 70 Ang | 7% | 74% | 17% | 38% | 39% |
| 80 Ang | 3% | 63% | 6% | 33% | 34% |
| 90 Ang | 1% | 55% | 2% | 29% | 32% |
| 100 Ang | 0% | 50% | 0% | 25% | 29% |
| Percent of surface area in pores greater than or equal to: | | | | | |
| 40 Ang | 23% | 56% | 42% | 29% | 18% |
| 50 Ang | 11% | 56% | 26% | 20% | 13% |
| 60 Ang | 5% | 49% | 15% | 15% | 10% |
| 70 Ang | 2% | 41% | 8% | 12% | 9% |
| 80 Ang | 1% | 31% | 3% | 10% | 7% |
| 90 Ang | 0% | 24% | 1% | 8% | 6% |
| 100 Ang | 0% | 20% | 0% | 7% | 5% |

From DFT calculation of pore volume distribution

TABLE 8

| Example Type | 38 (Cat 1) Control | 39 (Cat 2) Inventive | 40 (Cat 3) Inventive | 41 (Cat 4) Inventive | 42 (Cat 5) Inventive |
|---|---|---|---|---|---|
| Pore volume (mL/g) inside pores of diameter greater than or equal to | | | | | |
| 40 Ang | 0.14 | 0.36 | 0.30 | 0.20 | 0.20 |
| 50 Ang | 0.08 | 0.36 | 0.21 | 0.17 | 0.17 |
| 60 Ang | 0.05 | 0.33 | 0.13 | 0.14 | 0.15 |
| 70 Ang | 0.02 | 0.30 | 0.07 | 0.11 | 0.14 |
| 80 Ang | 0.01 | 0.26 | 0.03 | 0.11 | 0.12 |
| 90 Ang | 0.00 | 0.23 | 0.01 | 0.09 | 0.11 |
| 100 Ang | 0.00 | 0.20 | 0.00 | 0.08 | 0.10 |

TABLE 8-continued

| Example Type | 38 (Cat 1) Control | 39 (Cat 2) Inventive | 40 (Cat 3) Inventive | 41 (Cat 4) Inventive | 42 (Cat 5) Inventive |
|---|---|---|---|---|---|
| Surface area (m$^2$/g) inside pores of diameter greater than or equal to | | | | | |
| 40 Ang | 53.6 | 128.2 | 103.0 | 52.7 | 46.1 |
| 50 Ang | 26.0 | 128.2 | 64.5 | 36.7 | 33.0 |
| 60 Ang | 12.5 | 112.0 | 36.0 | 27.4 | 25.8 |
| 70 Ang | 5.6 | 93.2 | 18.7 | 17.8 | 22.3 |
| 80 Ang | 2.4 | 70.6 | 6.2 | 17.8 | 18.4 |
| 90 Ang | 0.6 | 55.0 | 1.5 | 14.5 | 15.7 |
| 100 Ang | 0.0 | 46.3 | 0.0 | 12.2 | 13.7 |

From DFT calculation of pore volume distribution

TABLE 9

| PSD | Support Sample | | |
|---|---|---|---|
| Example | 43 | 44 | 45 |
| D10, μm | 3.15 | 17.6 | 2.58 |
| D50, μm | 4.68 | 38.3 | 6.83 |
| D90, μm | 56.64 | 72.1 | 15.5 |
| D90/D10 | 17.98 | 4.10 | 6.01 |
| Span | 11.4 | 1.4 | 1.9 |

TABLE 10

| Example | d50 μm | Heat Treatment | Heat Time | Metallocene mg | Support Activity kg/g/h | Met Activity g/mg/h | Quality of Run |
|---|---|---|---|---|---|---|---|
| 44A | 38.3 | 250° C. | 24 h | 0.8 | 1.76 | 330 | Good |
| 44B | 38.3 | 250° C. | 24 h | 0.8 | 1.69 | 317 | Good |
| 44C | 38.3 | 250° C. | 2 h | 0.8 | 1.69 | 317 | Good |
| 45A | 6.8 | 250° C. | 1.5 h | 0.8 | 2.59 | 485 | Poor |
| 45B | 6.8 | 250° C. | 2 h | 0.8 | 2.12 | 397 | Poor |

TABLE 11

| | Example | | | | | | |
|---|---|---|---|---|---|---|---|
| | 46 | 47 | 48 | 49 | 50 | 51 | 52 |
| Heat treatment | 25° C. | 280° C. | 300° C. | 300° C. | 25° C. | 300° C. | 300° C. |
| Mn, kg/mol | 202 | 144 | 209 | 213 | 246 | 150 | 149 |
| Mw, kg/mol | 547 | 467 | 522 | 524 | 661 | 410 | 373 |
| Mz, kg/mol | 1314 | 1044 | 1152 | 1150 | 1682 | 880 | 753 |
| Mw/Mn | 2.71 | 3.25 | 2.50 | 2.47 | 2.68 | 2.73 | 2.50 |
| Mz/Mw | 2.40 | 2.23 | 2.21 | 2.19 | 2.54 | 2.14 | 2.02 |
| Eo, Pa-s | 1,956,000 | 1,245,000 | 2,174,000 | 2,359,000 | 2,597,000 | 586,100 | 577,900 |
| Tau, s | 2.98 | 1.90 | 3.27 | 3.51 | 4.12 | 0.90 | 0.98 |
| CY-a | 0.515 | 0.501 | 0.547 | 0.569 | 0.541 | 0.467 | 0.480 |
| MI, g/10 min | 0.004 | 0.007 | 0.004 | 0.003 | 0.003 | 0.015 | 0.015 |
| HLMI, g/10 min | 0.070 | 0.115 | 0.058 | 0.051 | 0.050 | 0.273 | 0.276 |
| HN Gx | 256,800 | 252,000 | 270,000 | 279,500 | 254,600 | 238,300 | 221,500 |
| HN Wx | 0.86 | 1.38 | 0.74 | 0.67 | 0.60 | 3.10 | 2.80 |
| Eta@ 0.1 | 988,700 | 689,800 | 1,137,000 | 1,254,000 | 1,254,000 | 358,100 | 356,600 |
| Tand@ 0.1 | 2.078 | 2.434 | 2.059 | 2.035 | 1.869 | 3.067 | 3.050 |
| Eta@ 100, Pa-s | 17,020 | 15,170 | 17,900 | 18,540 | 17,780 | 12,030 | 11,380 |
| Tand@ 100 | 0.366 | 0.390 | 0.351 | 0.342 | 0.346 | 0.453 | 0.439 |
| Eta@ MI, Pa-s | 1.48E+06 | 9.23E+05 | 1.73E+06 | 1.93E+06 | 2.04E+06 | 4.07E+05 | 4.05E+05 |
| Freq@MI, rad/s | 0.013 | 0.021 | 0.011 | 0.010 | 0.010 | 0.048 | 0.049 |
| Eta@HLMI, Pa-s | 695,600 | 420,300 | 865,900 | 1,005,000 | 982,900 | 171,600 | 167,300 |
| Freq@HLMI, rad/s | 0.28 | 0.47 | 0.23 | 0.20 | 0.20 | 1.15 | 1.18 |
| LCB/Million C | 0.31 | 0.44 | 0.49 | 0.53 | 0.08 | 0.26 | 0.59 |

| | Example | | | | | | |
|---|---|---|---|---|---|---|---|
| | 53 | 54 | 55 | 56 | 57 | 58 | 59 |
| Heat treatment | — | — | 280° C. | 280° C. | 280° C. | 250° C. | 250° C. |
| Mn, kg/mol | 105 | 141 | 114 | 118 | 118 | 112 | 110 |
| Mw, kg/mol | 296 | 378 | 312 | 324 | 323 | 282 | 288 |
| Mz, kg/mol | 673 | 847 | 687 | 706 | 722 | 525 | 545 |
| Mw/Mn | 2.82 | 2.67 | 2.73 | 2.74 | 2.74 | 2.52 | 2.61 |
| Mz/Mw | 2.27 | 2.24 | 2.20 | 2.18 | 2.24 | 1.86 | 1.90 |
| Eo, Pa-s | 233,300 | 413,700 | 213,200 | 195,300 | 234,500 | 175,600 | 187,000 |
| Tau, s | 0.36 | 0.66 | 0.36 | 0.33 | 0.40 | 0.29 | 0.30 |
| CY-a | 0.434 | 0.466 | 0.470 | 0.463 | 0.456 | 0.465 | 0.470 |
| MI, g/10 min | 0.041 | 0.022 | 0.042 | 0.046 | 0.039 | 0.051 | 0.048 |
| HLMI, g/10 min | 0.784 | 0.395 | 0.779 | 0.862 | 0.745 | 0.941 | 0.862 |
| HN Gx | 224,000 | 230,100 | 216,000 | 218,600 | 211,900 | 224,700 | 229,500 |
| HN Wx | 8.32 | 4.27 | 7.67 | 8.66 | 7.18 | 9.84 | 9.27 |
| Eta@ 0.1 | 156,100 | 267,400 | 152,700 | 140,500 | 161,700 | 129,000 | 137,700 |
| Tand@ 0.1 | 3.974 | 3.444 | 4.391 | 4.502 | 4.076 | 4.771 | 4.752 |
| Eta@ 100, Pa-s | 8,616 | 10,640 | 8,377 | 8,182 | 8,447 | 8,070 | 8,384 |
| Tand@ 100 | 0.559 | 0.478 | 0.528 | 0.545 | 0.530 | 0.558 | 0.548 |

TABLE 11-continued

| | | | | | | | |
|---|---|---|---|---|---|---|---|
| Eta@ MI, Pa-s | 1.49E+05 | 2.84E+05 | 1.46E+05 | 1.32E+05 | 1.56E+05 | 1.20E+05 | 1.30E+05 |
| Freq@MI, rad/s | 0.132 | 0.069 | 0.135 | 0.149 | 0.127 | 0.164 | 0.152 |
| Eta@HLMI, Pa-s | 57,660 | 117,300 | 58,520 | 52,880 | 60,490 | 48,860 | 53,790 |
| Freq@HLMI, rad/s | 3.42 | 1.68 | 3.37 | 3.73 | 3.26 | 4.03 | 3.66 |
| LCB/Million C | 0.65 | 0.23 | | 0.07 | 0.29 | 0.59 | 0.56 |

| | Example | | | | Support | | |
|---|---|---|---|---|---|---|---|
| | 60 | 61 | 62 | 63 | 64 | 65 | 66 |
| Heat treatment | 250° C. | 250° C. | 250° C. | 250° C. | 250° C. | 250° C. | 250° C. |
| Mn, kg/mol | 113 | 116 | 135 | 116 | 88 | 102 | 145 |
| Mw, kg/mol | 302 | 327 | 364 | 334 | 310 | 269 | 447 |
| Mz, kg/mol | 641 | 648 | 742 | 703 | 783 | 632 | 1162 |
| Mw/Mn | 2.66 | 2.82 | 2.70 | 2.87 | 3.52 | 2.63 | 3.08 |
| Mz/Mw | 2.12 | 1.98 | 2.04 | 2.10 | 2.53 | 2.35 | 2.60 |
| Eo, Pa-s | 196,000 | 298,300 | 446,600 | 330,700 | 180,300 | 106,400 | 551,400 |
| Tau, s | 0.32 | 0.51 | 0.81 | 0.57 | 0.25 | 0.15 | 1.05 |
| CY-a | 0.473 | 0.471 | 0.478 | 0.477 | 0.330 | 0.398 | 0.479 |
| MI, g/10 min | 0.045 | 0.030 | 0.020 | 0.027 | 0.074 | 0.096 | 0.016 |
| HLMI, g/10 min | 0.819 | 0.556 | 0.371 | 0.491 | 1.764 | 1.937 | 0.308 |
| HN Gx | 228,600 | 215,100 | 205,900 | 216,500 | 197,700 | 231,000 | 195,200 |
| HN Wx | 8.74 | 5.43 | 3.39 | 4.82 | 16.60 | 22.06 | 2.59 |
| Eta@ 0.1 | 143,800 | 203,300 | 284,800 | 224,100 | 94,600 | 74,640 | 334,100 |
| Tand@ 0.1 | 4.679 | 3.845 | 3.267 | 3.746 | 3.303 | 4.848 | 2.953 |
| Eta@ 100, Pa-s | 8,498 | 9,246 | 10,070 | 9,596 | 6,188 | 6,357 | 10,240 |
| Tand@ 100 | 0.540 | 0.495 | 0.454 | 0.481 | 0.708 | 0.702 | 0.435 |
| Eta@ MI, Pa-s | 1.36E+05 | 2.05E+05 | 3.08E+05 | 2.30E+05 | 7.78E+04 | 6.23E+04 | 3.77E+05 |
| Freq@MI, rad/s | 0.145 | 0.096 | 0.064 | 0.086 | 0.253 | 0.317 | 0.052 |
| Eta@HLMI, Pa-s | 56,620 | 81,920 | 121,600 | 93,270 | 23,290 | 23,050 | 144,400 |
| Freq@HLMI, rad/s | 3.48 | 2.41 | 1.62 | 2.11 | 8.46 | 8.55 | 1.37 |
| LCB/Million C | 0.37 | 0.50 | 0.48 | 0.53 | 0.44 | 0.47 | 0.18 |

| | Support | | | | | | |
|---|---|---|---|---|---|---|---|
| | 67 | 68 | 69 | 70 | 71 | 72 | 73 |
| Heat treatment | 100° C. | 100° C. | 250° C. | 250° C. | 250° C. | 250° C. | 280° C. |
| Mn, kg/mol | 108 | 92 | 113 | 101 | 100 | 94 | 118 |
| Mw, kg/mol | 301 | 258 | 315 | 282 | 267 | 277 | 323 |
| Mz, kg/mol | 687 | 629 | 726 | 623 | 576 | 802 | 722 |
| Mw/Mn | 2.79 | 2.80 | 2.78 | 2.79 | 2.66 | 2.94 | 2.74 |
| Mz/Mw | 2.28 | 2.44 | 2.30 | 2.21 | 2.16 | 2.90 | 2.24 |
| Eo, Pa-s | 182,700 | 106,200 | 743,700 | 105,300 | 97,900 | 92,190 | 234,500 |
| Tau, s | 0.29 | 0.14 | 1.31 | 0.19 | 0.15 | 0.13 | 0.40 |
| CY-a | 0.420 | 0.338 | 0.294 | 0.425 | 0.420 | 0.395 | 0.456 |
| MI, g/10 min | 0.054 | 0.118 | 0.024 | 0.095 | 0.100 | 0.112 | 0.039 |
| HLMI, g/10 min | 1.078 | 2.677 | 0.700 | 1.948 | 1.971 | 2.244 | 0.745 |
| HN Gx | 212,600 | 219,300 | 137,700 | 189,500 | 220,900 | 234,000 | 211,900 |
| HN Wx | 10.68 | 29.47 | 3.72 | 16.13 | 20.66 | 26.09 | 7.18 |
| Eta@ 0.1 | 122,600 | 63,870 | 219,200 | 75,870 | 71,960 | 65,640 | 161,700 |
| Tand@ 0.1 | 4.130 | 4.024 | 2.037 | 4.901 | 5.255 | 5.078 | 4.076 |
| Eta@ 100, Pa-s | 7,572 | 5,429 | 7,584 | 5,821 | 6,202 | 6,030 | 8,447 |
| Tand@ 100 | 0.595 | 0.779 | 0.591 | 0.642 | 0.680 | 0.729 | 0.530 |
| Eta@ MI, Pa-s | 1.12E+05 | 4.93E+04 | 2.29E+05 | 6.35E+04 | 6.04E+04 | 5.37E+04 | 1.56E+05 |
| Freq@MI, rad/s | 0.177 | 0.400 | 0.086 | 0.310 | 0.326 | 0.367 | 0.127 |
| Eta@HLMI, Pa-s | 41,020 | 15,850 | 51,730 | 22,020 | 22,690 | 19,940 | 60,490 |
| Freq@HLMI, rad/s | 4.81 | 12.43 | 3.81 | 8.95 | 8.69 | 9.89 | 3.26 |
| LCB/Million C | 0.59 | 0.71 | 2.13 | 0.20 | 0.38 | 0.11 | 0.29 |

| | Support | | | | | |
|---|---|---|---|---|---|---|
| | 74 | 75 | 76 | 77 | 78 | 79 |
| Heat treatment | 600° C. | 600° C. | 600° C. | 600° C. | 600° C. | 600° C. |
| Mn, kg/mol | 92 | 148 | 106 | 92 | 126 | 118 |
| Mw, kg/mol | 251 | 383 | 296 | 251 | 343 | 309 |
| Mz, kg/mol | 477 | 829 | 593 | 477 | 788 | 663 |
| Mw/Mn | 2.72 | 2.58 | 2.78 | 2.72 | 2.73 | 2.63 |
| Mz/Mw | 1.90 | 2.16 | 2.01 | 1.90 | 2.30 | 2.14 |
| Eo, Pa-s | 136,800 | 513,200 | 194,700 | 136,800 | 335,400 | 243,600 |
| Tau, s | 0.20 | 0.88 | 0.30 | 0.20 | 0.51 | 0.41 |
| CY-a | 0.424 | 0.470 | 0.444 | 0.424 | 0.425 | 0.456 |
| MI, g/10 min | 0.071 | 0.018 | 0.048 | 0.071 | 0.029 | 0.038 |
| HLMI, g/10 min | 1.369 | 0.323 | 0.892 | 1.369 | 0.561 | 0.712 |
| HN Gx | 229,400 | 216,000 | 232,500 | 229,400 | 223,900 | 214,800 |
| HN Wx | 15.14 | 3.18 | 9.93 | 15.14 | 5.98 | 7.01 |
| Eta@ 0.1 | 97,400 | 317,300 | 137,100 | 97,400 | 207,700 | 167,300 |
| Tand@ 0.1 | 4.755 | 3.119 | 4.412 | 4.755 | 3.434 | 4.037 |
| Eta@ 100, Pa-s | 7,216 | 10,810 | 8,398 | 7,216 | 9,606 | 8,628 |

TABLE 11-continued

| | | | | | | |
|---|---|---|---|---|---|---|
| Tand@ 100 | 0.635 | 0.453 | 0.571 | 0.635 | 0.531 | 0.527 |
| Eta@ MI, Pa-s | 8.58E+04 | 3.52E+05 | 1.28E+05 | 8.58E+04 | 2.10E+05 | 1.62E+05 |
| Freq@MI, rad/s | 0.230 | 0.056 | 0.154 | 0.230 | 0.094 | 0.122 |
| Eta@HLMI, Pa-s | 33,040 | 141,300 | 51,460 | 33,040 | 80,190 | 63,500 |
| Freq@HLMI, rad/s | 5.97 | 1.40 | 3.83 | 5.97 | 2.46 | 3.10 |
| LCB/Million C | 0.87 | 0.38 | 0.42 | 0.87 | 0.38 | 0.53 |

TABLE 12

| Example | Metal Alkyl | Heat Treatment | Metallocene mg | Tau, s | CY-a |
|---|---|---|---|---|---|
| 80 | DEZ | 250° C. | 0.8 | 0.25 | 0.3295 |
| 81 | DEZ | 100° C. | 0.8 | 0.29 | 0.4199 |
| 82 | DEZ | 25° C. | 0.8 | 2.79 | 0.5586 |
| 83 | TIBA | 250° C. | 0.8 | 0.15 | 0.3977 |
| 84 | TIBA | 100° C. | 0.8 | 0.14 | 0.3881 |
| 85 | TIBA | 25° C. | 0.8 | 3.04 | 0.5578 |

TABLE 13

| Example | Hydrothermal Treatment | Heat Treatment | Heat Time | Metallocene mg | Support Activity kg/g/h | Met Activity g/mg/h |
|---|---|---|---|---|---|---|
| 86 | water, pH < 1, 80-90° C., 7 days | 250° C. | 2.5 h | 0.8 | 6.28 | 1177 |
| 87 | None | 250° C. | 2.5 h | 0.8 | 3.92 | 735 |
| 88 | water, pH = 11, 60-80° C., 1 day | | thickened and unable to handle | | | |

TABLE 14

| Example | Activator-Support | Heat treatment | Run Time min | Ind Time min | $H_2$ mg | Polymer g | Met Activity g/g/h | Support Activity g/g/h | I10 g/10 min | HLMI g/10 min | Ratio of HLMI/I10 | Precontact |
|---|---|---|---|---|---|---|---|---|---|---|---|---|
| 89 | F—Si—Al | 600° C. | 35 | 1 | 32.2 | 242 | 153,651 | 1,383 | 2 | 12 | 5.8 | N |
| 90 | F—Si—Al | 600° C. | 33.8 | 2 | 40.1 | 275 | 180,802 | 1,611 | 3.5 | 18.4 | 5.3 | Y |
| 91 | Z130 + Zn | 280° C. | 30.4 | 0 | 39.3 | 273 | 199,561 | 1,778 | 3 | 16 | 5.3 | N |
| 92 | Z130 + Zn | 280° C. | 31.5 | 1 | 38.6 | 274 | 193,298 | 1,711 | 4.3 | 21.2 | 4.9 | Y |
| 93 | Z130FR | 280° C. | 35 | 1.5 | 37.5 | 259 | 164,444 | 1,485 | 2.7 | 15 | 5.6 | N |
| 94 | Z130FR | 280° C. | 35 | 2 | 30.9 | 209 | 132,698 | 1,175 | 4 | 19 | 4.8 | Y |
| 95 | Z120 | 280° C. | 35 | 2 | 31.9 | 255 | 161,905 | 1,433 | 4.3 | 19 | 4.5 | N |
| 96 | Z120 | 280° C. | 35 | 1 | 31.9 | 239 | 151,746 | 1,343 | 4.6 | 22 | 4.7 | Y |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A sulfated bentonite composition characterized by a total pore volume from 0.4 to 1 mL/g, a total BET surface area from 200 to 400 m²/g, and an average pore diameter from 55 to 100 Angstroms (Ang).

Aspect 2. The composition defined in aspect 1, wherein the composition has a total pore volume in any suitable range or any range disclosed herein, e.g., from 0.4 to 0.8 mL/g, from 0.42 to 0.7 mL/g, from 0.45 to 0.8 mL/g, or from 0.45 to 0.7 mL/g.

Aspect 3. The composition defined in aspect 1 or 2, wherein the composition has a total BET surface area in any suitable range or any range disclosed herein, e.g., from 225 to 375 m²/g, from 240 to 360 m²/g, or from 250 to 350 m²/g.

Aspect 4. The composition defined in any one of aspects 1-3, wherein the composition has an average pore diameter in any suitable range or any range disclosed herein, e.g., from 55 to 90, from 55 to 85, from 60 to 90, or from 60 to 85 Ang.

Aspect 5. The composition defined in any one of aspects 1-4, wherein the composition has any suitable percentage of the total pore volume in pores with diameters of greater than or equal to 60 Ang or a percentage in any range disclosed herein, e.g., from 18 to 95%, from 18 to 85%, from 25 to 90%, or from 25 to 85%.

Aspect 6. The composition defined in any one of aspects 1-5, wherein the composition has any suitable amount of pore volume in pores with diameters of greater than or equal to 60 Ang or an amount in any range disclosed herein, e.g., from 0.08 to 0.5 mL/g, from 0.1 to 0.5 mL/g, from 0.8 to 0.4 mL/g, or from 0.1 to 0.38 mL/g.

Aspect 7. The composition defined in any one of aspects 1-6, wherein the composition has any suitable percentage of the total BET surface area in pores with diameters of greater than or equal to 60 Ang or a percentage in any range disclosed herein, e.g., from 7 to 60%, from 7 to 55%, from 9 to 57%, or from 9 to 53%.

Aspect 8. The composition defined in any one of aspects 1-7, wherein the composition has any suitable amount of surface area in pores with diameters of greater than or equal to 60 Ang or an amount in any range disclosed herein, e.g., from 15 to 150 m²/g, from 15 to 120 m²/g, from 20 to 130 m²/g, or from 22 to 120 m²/g.

Aspect 9. The composition defined in any one of aspects 1-8, wherein the composition is further characterized by the features defined in any one of aspects 10-15.

Aspect 10. A sulfated bentonite composition characterized by a d50 average particle size in a range from 15 to 50 μm, and a ratio of d90/d10 from 3 to 15.

Aspect 11. The composition defined in aspect 10, wherein the composition has a d50 average particle size in any suitable range or any range disclosed herein, e.g., from 15 to 40 μm, from 17 to 45 μm, or from 20 to 40 μm.

Aspect 12. The composition defined in aspect 10 or 11, wherein the ratio of d90/d10 is in any suitable range or any range disclosed herein, e.g., from 3 to 14, from 3 to 12, from 4 to 15, or from 4 to 12.

Aspect 13. The composition defined in any one of aspects 10-12, wherein the composition has any suitable particle size span or a span in any range disclosed herein, e.g., from 1 to 3.2, from 1.1 to 2.8, from 1.2 to 2.7, or from 1.3 to 2.6.

Aspect 14. The composition defined in any one of aspects 10-13, wherein the composition has any suitable d10 particle size or a d10 particle size in any range disclosed herein, e.g., from 4 to 25 μm, from 4 to 22 μm, from 4.5 to 22 μm, or from 5 to 20 μm.

Aspect 15. The composition defined in any one of aspects 10-14, wherein the composition has any suitable ratio of d90/d50 or a ratio in any range disclosed herein, e.g., from 1.5 to 3.5, from 1.5 to 3, from 1.6 to 3.2, from 1.7 to 3, or from 1.8 to 2.7.

Aspect 16. The composition defined in any one of aspects 10-15, wherein the composition is further characterized by the features defined in any one of aspects 1-8.

Aspect 17. A sulfated bentonite composition comprising a sulfated bentonite and from 0.2 to 10 mmol/g of zinc, phosphorus, or both (per g of sulfated bentonite).

Aspect 18. The composition defined in aspect 17, wherein the composition contains any suitable amount of zinc (or phosphorus) or an amount in any range disclosed herein, e.g., from 0.3 to 8, from 0.5 to 5, from 0.8 to 4, from 1 to 5, or from 1.5 to 3.5 mmol/g.

Aspect 19. The composition defined in aspect 17 or 18, wherein the composition is further characterized by the features defined in any one of aspects 1-16.

Aspect 20. A sulfated bentonite composition comprising a sulfated bentonite and from 10 to 90 wt. % of colloidal particles, based on the composition).

Aspect 21. The composition defined in aspect 20, wherein the composition contains any suitable amount of colloidal particles or an amount in any range disclosed herein, e.g., from 15 to 80 wt. %, from 20 to 70 wt. %, from 25 to 60 wt. %, or from 30 to 50 wt. %.

Aspect 22. The composition defined in aspect 20 or 21, wherein the colloidal particles comprise a colloidal silica.

Aspect 23. The composition defined in aspect 20 or 21, wherein the colloidal particles comprise a colloidal aluminum-zirconium.

Aspect 24. The composition defined in any one of aspects 20-23, wherein the composition is further characterized by the features defined in any one of aspects 1-16.

Aspect 25. A catalyst composition comprising a metallocene compound, a co-catalyst, and the sulfated bentonite composition defined in any one of aspects 1-24.

Aspect 26. A process for producing a catalyst composition, the process comprising contacting (in any order) a metallocene compound, a co-catalyst, and the sulfated bentonite composition defined in any one of aspects 1-24 to produce the catalyst composition.

Aspect 27. The process defined in aspect 26, wherein the sulfated bentonite composition is contacted first with an organoaluminum co-catalyst for a suitable pre-contact time to form a pre-contacted mixture, and the pre-contacted mixture is then contacted with the metallocene compound to produce the catalyst composition.

Aspect 28. The process defined in aspect 26, wherein the sulfated bentonite composition is contacted first with an organozinc co-catalyst for a suitable pre-contact time to form a pre-contacted mixture, and the pre-contacted mixture is then contacted with the metallocene compound to produce the catalyst composition.

Aspect 29. The process defined in any one of aspects 26-28, further comprising a step of heat treating the sulfated bentonite composition at any suitable temperature or a temperature in any range disclosed herein, e.g., from 100° C. to 500° C., from 100° C. to 400° C., from 100° C. to 350° C., or from 200° C. to 400° C., prior to the contacting step.

Aspect 30. The process defined in any one of aspects 26-28, further comprising a step of heat treating the sulfated bentonite composition at a temperature of less than or equal to 200° C., less than or equal to 100° C., or less than or equal to 50° C., prior to the contacting step.

Aspect 31. The process defined in any one of aspects 26-28, further comprising a step of microwave treating the sulfated bentonite composition for any suitable period of time or any time period disclosed herein, e.g., from 10 sec to 10 min, from 30 sec to 5 min, or from 30 sec to 2 min, prior to the contacting step.

Aspect 32. The process defined in any one of aspects 26-31, further comprising, prior to heat treating or microwave treating, impregnating the sulfated bentonite composition with zinc, phosphorus, or a combination thereof Aspect 33. The process defined in any one of aspects 26-31, further comprising, prior to heat treating or microwave treating, adjusting a pH of a mixture of the sulfated bentonite composition in water to less than or equal to 3, less than or equal to 2, or less than or equal to 1, then subjecting the low pH mixture to a temperature in a range from 50° C. to 95° C.

Aspect 34. The process defined in any one of aspects 26-31, further comprising, prior to heat treating or microwave treating, sonicating a mixture of the sulfated bentonite composition in water, then adding an alcohol compound to re-agglomerate the sulfated bentonite composition.

Aspect 35. The process defined in aspect 34, further comprising adding a colloidal silica, a colloidal aluminum-zirconium, PBu$_4$OH, adamantyl amine, or a combination thereof, to the mixture of the sulfated bentonite composition in water while sonicating.

Aspect 36. The process defined in any one of aspects 26-35, further comprising, prior to heat treating or microwave treating, air classifying the sulfated bentonite composition to remove a portion of the larger and smaller particles.

Aspect 37. The catalyst composition prepared by the process defined in any one of aspects 26-36.

Aspect 38. The composition or process defined in any one of aspects 25-37, wherein the co-catalyst comprises an organoaluminum compound, an organozinc compound, an aluminoxane compound, an organoboron or organoborate compound, an ionizing ionic compound, or any combination thereof Aspect 39. The composition or process defined in any one of aspects 25-37, wherein the co-catalyst comprises an organoaluminum compound (e.g., TIBA), an organozinc compound (e.g., DEZ), or both.

Aspect 40. The composition or process defined in any one of aspects 25-39, wherein the catalyst composition is substantially free of aluminoxane compounds, organoboron or organoborate compounds, ionizing ionic compounds, or combinations thereof.

Aspect 41. The composition or process defined in any one of aspects 25-40, wherein a weight ratio of the metallocene compound to the sulfated bentonite composition is in any suitable range of weight ratios or any range disclosed herein, e.g., from 1:1 to 1:100,000, from 1:10 to 1:10,000, from 1:20 to 1:1000, or from 1:50 to 1:500.

Aspect 42. The composition or process defined in any one of aspects 25-41, wherein the metallocene compound comprises any suitable bridged metallocene compound or any bridged metallocene compound disclosed herein.

Aspect 43. The composition or process defined in any one of aspects 25-42, wherein the metallocene compound comprises any suitable unbridged metallocene compound or any unbridged metallocene compound disclosed herein.

Aspect 44. The composition or process defined in any one of aspects 25-43, wherein the catalyst composition comprises two or more metallocene compounds.

Aspect 45. A modified sulfated bentonite product prepared by the process defined in aspect 34 or 35.

Aspect 46. The composition or process or product defined in any one of aspects 1-45, wherein the sulfated bentonite composition (or the sulfated bentonite, or the modified sulfated bentonite product) has a residual acidity value of 3 to 14 mg KOH/g at the phenolphthalein endpoint; and/or has a calcium content of from 2 to 7 wt. %, from 3 to 6 wt. %, or from 3.5 to 6 wt. %; and/or has a silicon content of from 25 to 35 wt. %, from 27 to 33 wt. %, or from 28 to 32 wt. %; and/or has a sodium content of from 0.05 to 0.5 wt. %, from 0.07 to 0.25 wt. %, or from 0.08 to 0.14 wt. %; and/or has a strontium content of from 0.05 to 0.5 wt. %, from 0.08 to 0.35 wt. %, or from 0.1 to 0.3 wt. %; and/or has a sulfur content of from 2 to 6 wt. %, from 2.5 to 5 wt. %, or from 2.8 to 4.8 wt. %; and/or has a titanium content of from 0.25 to 1 wt. %, from 0.4 to 0.8 wt. %, or from 0.5 to 0.75 wt. %.

Aspect 47. An olefin polymerization process, the process comprising contacting the catalyst composition defined in any one of aspects 25 or 37-46 with an olefin monomer and an optional olefin comonomer in a polymerization reactor system under polymerization conditions to produce an olefin polymer.

Aspect 48. An olefin polymerization process, the process comprising performing the process to produce the catalyst composition defined in any one of aspects 26-36 or 38-46, and contacting the catalyst composition with an olefin monomer and an optional olefin comonomer in a polymerization reactor system under polymerization conditions to produce an olefin polymer.

Aspect 49. The process defined in aspect 47 or 48, wherein the olefin monomer comprises any olefin monomer disclosed herein, e.g., any $C_2$-$C_{20}$ olefin.

Aspect 50. The process defined in any one of aspects 47-49, wherein the olefin monomer and the optional olefin comonomer independently comprise a $C_2$-$C_{20}$ alpha-olefin.

Aspect 51. The process defined in any one of aspects 47-50, wherein the olefin monomer comprises ethylene.

Aspect 52. The process defined in any one of aspects 47-51, wherein the catalyst composition is contacted with ethylene and an olefin comonomer comprising a $C_3$-$C_{10}$ alpha-olefin.

Aspect 53. The process defined in any one of aspects 47-52, wherein the catalyst composition is contacted with ethylene and an olefin comonomer comprising 1-butene, 1-hexene, 1-octene, or a mixture thereof.

Aspect 54. The process defined in any one of aspects 47-53, wherein the polymerization reactor system comprises a batch reactor, a slurry reactor, a gas-phase reactor, a solution reactor, a high pressure reactor, a tubular reactor, an autoclave reactor, or a combination thereof Aspect 55. The process defined in any one of aspects 47-54, wherein the polymerization reactor system comprises a slurry reactor, a gas-phase reactor, a solution reactor, or a combination thereof.

Aspect 56. The process defined in any one of aspects 47-55, wherein the polymerization reactor system comprises a loop slurry reactor.

Aspect 57. The process defined in any one of aspects 47-56, wherein the polymerization reactor system comprises a single reactor.

Aspect 58. The process defined in any one of aspects 47-56, wherein the polymerization reactor system comprises two or more reactors.

Aspect 59. The process defined in any one of aspects 47-58, wherein the olefin polymer comprises any olefin polymer disclosed herein.

Aspect 60. The process defined in any one of aspects 47-59, wherein the olefin polymer comprises an ethylene homopolymer, an ethylene/1-butene copolymer, an ethylene/1-hexene copolymer, and/or an ethylene/1-octene copolymer.

Aspect 61. The process defined in any one of aspects 47-60, wherein the polymerization conditions comprise a polymerization reaction temperature in a range from 60° C. to 120° C. and a reaction pressure in a range from 200 to 1000 psig (1.4 to 6.9 MPa).

Aspect 62. The process defined in any one of aspects 47-61, wherein the polymerization conditions are substantially constant, e.g., for a particular polymer grade.

Aspect 63. The process defined in any one of aspects 47-62, wherein no hydrogen is added to the polymerization reactor system.

Aspect 64. The process defined in any one of aspects 47-62, wherein hydrogen is added to the polymerization reactor system.

Aspect 65. The olefin polymer produced by the olefin polymerization process defined in any one of aspects 47-64.

Aspect 66. An ethylene polymer having a Mw in a range from 350 to 700 kg/mol, a ratio of Mw/Mn in a range from 2 to 4, a ratio of Mz/Mw in a range from 1.8 to 4, a CY-a parameter in a range from 0.4 to 0.65, and a relaxation time as a function of Mz that is greater than $9.818 \times 10^{-7}$ $(Mz)^2 + 0.001503(Mz) - 0.5$, wherein Mz is in kg/mol and the relaxation time is in sec.

Aspect 67. An ethylene polymer having a Mw in a range from 350 to 700 kg/mol, a ratio of Mw/Mn in a range from 2 to 4, a ratio of Mz/Mw in a range from 1.8 to 4, a CY-a parameter in a range from 0.4 to 0.65, and a viscosity at 0.1 $sec^{-1}$ as a function of Mz that is greater than $0.0985(Mz)^2+890.7(Mz)-300,000$, wherein Mz is in kg/mol and the viscosity is in Pa-sec.

Aspect 68. The ethylene polymer defined in aspect 66 or 67, wherein the Mw is in any range disclosed herein, e.g., from 400 to 700 kg/mol, from 400 to 600 kg/mol, or from 450 to 600 kg/mol.

Aspect 69. The ethylene polymer defined in any one of aspects 66-68, wherein the ratio of Mw/Mn is in any range disclosed herein, e.g., from 2 to 3.5, from 2 to 3, from 2.2 to 3.5, from 2.2 to 3.2, or from 2.2 to 3.

Aspect 70. The ethylene polymer defined in any one of aspects 66-69, wherein the ratio of Mz/Mw is in any range disclosed herein, e.g., from 1.8 to 3, from 1.8 to 2.7, from 2 to 4, from 2 to 3, or from 2 to 2.8.

Aspect 71. The ethylene polymer defined in any one of aspects 66-70, wherein the CY-a parameter is in any range disclosed herein, e.g., from 0.4 to 0.6, from 0.45 to 0.65, from 0.45 to 0.6, from 0.48 to 0.58, from 0.5 to 0.6, or from 0.5 to 0.58.

Aspect 72. The ethylene polymer defined in any one of aspects 66-71, wherein the ethylene polymer has a density in any range disclosed herein, e.g., from 0.90 to 0.96, from 0.91 to 0.96, or from 0.92 to 0.95 g/cm$^3$.

Aspect 73. The ethylene polymer defined in any one of aspects 66-72, wherein the ethylene polymer has a HLMI in any range disclosed herein, e.g., from 0 to 80, from 0 to 25, or from 0 to 10 g/10 min.

Aspect 74. The ethylene polymer defined in any one of aspects 66-73, wherein the ethylene polymer is produced by the process defined in any one of aspects 47-64.

Aspect 75. An article of manufacture comprising the ethylene polymer defined in any one of aspects 66-74.

We claim:

1. A sulfated bentonite composition characterized by:
   a total pore volume from 0.4 to 1 mL/g;
   a total BET surface area from 200 to 400 m$^2$/g;
   an average pore diameter from 55 to 100 Angstroms (Ang); and
   wherein the composition contains from 25 to 35 wt. % silicon.

2. The composition of claim 1, wherein from 18 to 95% of the total pore volume is in pores with diameters of greater than or equal to 60 Ang.

3. The composition of claim 1, wherein the composition has a pore volume of from 0.08 to 0.5 mL/g in pores with diameters of greater than or equal to 60 Ang.

4. The composition of claim 1, wherein from 7 to 60% of the total BET surface area is in pores with diameters of greater than or equal to 60 Ang.

5. The composition of claim 1, wherein the composition has a surface area of from 15 to 150 m$^2$/g in pores with diameters of greater than or equal to 60 Ang.

6. The composition of claim 1, wherein the composition is further characterized by:
   a d50 average particle size from 15 to 50 µm; and
   a ratio of d90/d10 from 3 to 15.

7. The composition of claim 1, wherein:
   the total pore volume is from 0.45 to 0.8 mL/g;
   the total BET surface area is from 225 to 375 m$^2$/g; and
   the average pore diameter is from 55 to 85 Ang.

8. The composition of claim 7, wherein:
   from 25 to 85% of the total pore volume is in pores with diameters of greater than or equal to 60 Ang; and
   from 9 to 53% of the total BET surface area is in pores with diameters of greater than or equal to 60 Ang.

9. The composition of claim 7, wherein the composition has:
   a pore volume of from 0.1 to 0.38 mL/g in pores with diameters of greater than or equal to 60 Ang; and/or
   a surface area of from 22 to 120 m$^2$/g in pores with diameters of greater than or equal to 60 Ang.

10. The composition of claim 1, wherein the composition contains:
    from 2 to 7 wt. % calcium; or
    from 0.05 to 0.5 wt. % sodium; or
    from 0.05 to 0.5 wt. % strontium; or
    from 2 to 6 wt. % sulfur; or
    from 0.25 to 1 wt. % titanium; or
    any combination thereof.

11. A catalyst composition comprising:
    a metallocene compound;
    a co-catalyst; and
    the sulfated bentonite composition of claim 1.

12. The composition of claim 11, wherein the co-catalyst comprises an organoaluminum compound, an organozinc compound, an aluminoxane compound, an organoboron or organoborate compound, an ionizing ionic compound, or any combination thereof.

13. The composition of claim 6, wherein the composition has a particle size span from 1 to 3.2.

14. The composition of claim 6, wherein the composition has a d10 particle size from 4 to 25 µm.

15. The composition of claim 6, wherein the composition has a ratio of d90/d50 from 1.5 to 3.5.

16. The composition of claim 11, wherein the metallocene compound comprises a bridged metallocene compound.

17. The composition of claim 11, wherein the metallocene compound comprises an unbridged metallocene compound.

18. The composition of claim 11, wherein the catalyst composition comprises two or more metallocene compounds.

19. A sulfated bentonite composition comprising:
    a sulfated bentonite; and
    from 0.2 to 10 mmol of zinc, phosphorus, or both, per g of the sulfated bentonite.

20. The composition of claim 19, wherein the composition comprises from 0.3 to 8 mmol/g of zinc.

21. The composition of claim 19, wherein the composition comprises from 0.3 to 8 mmol/g of phosphorus.

22. The composition of claim 19, wherein the composition is characterized by:
    a total pore volume from 0.4 to 1 mL/g;
    a total BET surface area from 200 to 400 m$^2$/g; and
    an average pore diameter from 55 to 100 Angstroms (Ang).

23. The composition of claim 19, wherein the composition is characterized by:
    a d50 average particle size from 15 to 50 µm; and
    a ratio of d90/d10 from 3 to 15.

24. A catalyst composition comprising:
    a metallocene compound;
    a co-catalyst; and
    the sulfated bentonite composition of claim 19.

* * * * *